United States Patent
Mott

(10) Patent No.: US 9,919,224 B2
(45) Date of Patent: Mar. 20, 2018

(54) COLOR SORTING PUZZLE GAME

(71) Applicant: Gabriel S. Mott, Paia, HI (US)

(72) Inventor: Gabriel S. Mott, Paia, HI (US)

( * ) Notice: Subject to any disclaimer, the term of this patent is extended or adjusted under 35 U.S.C. 154(b) by 183 days.

(21) Appl. No.: 14/609,068

(22) Filed: Jan. 29, 2015

(65) Prior Publication Data

US 2016/0001174 A1 Jan. 7, 2016

Related U.S. Application Data

(60) Provisional application No. 62/020,671, filed on Jul. 3, 2014.

(51) Int. Cl.
| | |
|---|---|
| *G06F 17/00* | (2006.01) |
| *A63F 13/822* | (2014.01) |
| *A63F 13/80* | (2014.01) |

(52) U.S. Cl.
CPC ............ *A63F 13/822* (2014.09); *A63F 13/80* (2014.09)

(58) Field of Classification Search
USPC .................................. 463/9–13; 273/292–294
See application file for complete search history.

(56) References Cited

U.S. PATENT DOCUMENTS

| | | | |
|---|---|---|---|
| 6,452,515 B1* | 9/2002 | Duquesnois | A63F 13/80 273/153 R |
| 8,771,048 B2* | 7/2014 | Wayans | A63F 13/80 463/9 |
| 2007/0243919 A1* | 10/2007 | Thelen | A63F 9/24 463/9 |
| 2010/0069133 A1* | 3/2010 | Takeda | A63F 13/10 463/9 |

* cited by examiner

*Primary Examiner* — Ronald Laneau
(74) *Attorney, Agent, or Firm* — Justin White

(57) ABSTRACT

A puzzle apparatus includes a display region to present a puzzle, and a plurality of colored swatches arrangeable within the display region. There are unsolved arrangements and at least one solved pattern, all being presentable within the display region. Each colored swatch is a substantially solid color that is different from the color of every other swatch. The colored swatches can form a solved pattern whereby each respective swatch is adjacent therewithin only to the other swatches that are closest in color to the respective swatch. The solved pattern can include a halation effect across its correctly placed colored swatches, while unsolved arrangements do not include such a halation effect. Child color swatches can be disposed between primary parent color swatches to form color gradients across the swatches. The puzzle apparatus can be a computing apparatus that includes a processor, a display component, and one or more input devices.

20 Claims, 21 Drawing Sheets

1300

Nx=number of children horizontally

| PrimaryParent1<br><br>r1<br>g1<br>b1 | Color of Child where<br>Nx= children in sequence<br><br>if r1<r2 then<br>$R=r1+((r2-r1)/(Nx+1))*(child\#)$<br><br>if g1<g2 then<br>$G=g1+((g2-r1)/(Nx+1))*(child\#)$<br><br>if b1<b2 then<br>$B=b1+((b2-b1)/(Nx+1))*(child\#)$<br><br>if r2<r1 then<br>$R=r1-((r1-r2)/(Nx+1))*(child\#)$<br>if g2<g1 then<br>$G=g1-((g1-g2)/(Nx+1))*(child\#)$<br><br>if b2<b1 then<br>$B=b1-((b1-b2)/(Nx+1))*(child\#)$<br><br>if b1=b2 then B=b1 | ••• | Primary<br>Parent2<br><br>r2<br>g2<br>b2 |
|---|---|---|---|
| Color of Child where<br>Ny= children in sequence<br><br>if r1<r3 then<br>$R=r1+((r3-r1)/(Ny+1))*(child\#)$<br>if g1<g3 then<br>$G=g1+((g3-r1)/(Ny+1))*(child\#)$<br>if b1<b3 then<br>$B=b1+((b3-b1)/(Ny+1))*(child\#)$<br><br>if r3<r1 then<br>$R=r1-((r1-r3)/(Ny+1))*(child\#)$<br>if g3<g1 then<br>$G=g1-((g1-g3)/(Ny+1))*(child\#)$<br>if b3<b1 then<br>$B=b1-((b1-b3)/(Ny+1))*(child\#)$<br>if b1=b3 then B=b1 | | | |
| ••• | | ••••• | ••• |
| PrimaryParent3<br>r3<br>g3<br>b3 | | | Primary<br>Parent4<br>r4<br>g4<br>b4 |

Ny=number of children vertically

3x3   4x4   5x5   etc..6x6..

1910

1901  1902  1903  1904

1905  1906  1907  1908

COLOR SORTING PUZZLE GAME

NOTICE OF RELATED APPLICATION

This application claims priority from U.S. Provisional Patent Application No. 62/020,671, entitled "COLOR SORTING PUZZLE GAME," filed Jul. 3, 2014, which application is incorporated herein in its entirety and for all purposes.

TECHNICAL FIELD

The present invention relates generally to game-based entertainment and learning devices and methods, and more particularly to puzzles and games having appearances and solutions based on particular color arrangements.

BACKGROUND

Puzzles and games have long been a huge source of amusement, entertainment, and even learning for young and old alike. Items such as jigsaw puzzles, crossword puzzles, Rubik's Cube®, Tetris®, and the like can improve problem solving, increase vocabulary, enhance reasoning skills, and can also be a fun way to socialize and improve fine motor skills, among other recognizable benefits. Many types of puzzles and games can be done alone or with other people, such as to foster cooperative play or even to encourage family time.

There are various types of puzzle and game categories, such as card games, board games, word games or puzzles, multi-player, solitaire or single player, video or computer games, and the like. While some puzzles and games are geared towards a younger audience, others are directed at an older audience. Although examples such as the aforementioned Rubik's Cube and Tetris do exist, it is often difficult to create a puzzle or game that combines simple rules with diverse skill levels, while still remaining popular and fun with young, old, simpler, and more sophisticated or smart audiences.

Despite the wide variety of offerings that are available, many puzzle and game enthusiasts still desire further variety when it comes to their puzzles and games. As such, while existing puzzles and games have worked well over many years, there is always a desire for improvement and new variations. In particular, what is desired are new varieties of puzzles and games that combine simple rules with diverse skill levels, that appeal to a wide range of users, and that still remain popular and fun to play.

SUMMARY

It is an advantage of the present disclosure to provide new puzzles and games that combine simple rules with diverse skill levels and that appeal to a wide range of users. This can be accomplished at least in part through the use of puzzles or games that are based upon the arrangement of differently colored swatches or tiles, such as where solutions to such puzzles involve placing the colored swatches next to other swatches that are closest in color. In particular, such puzzles or games can include solutions having a visual halation effect across colored tiles that are correctly placed next to each other.

Embodiments of the present disclosure can include a puzzle or game that may have various pieces, components, items, or other associated apparatuses. In various embodiments, a puzzle apparatus can include a display region adapted to present a puzzle to a user, as well as a plurality of colored swatches or tiles that can be arranged within the display region. The puzzle can have one or more unsolved arrangements and at least one solved pattern, and each of the one or more unsolved arrangements and at least one solved pattern can be presentable within said display region. Each of the plurality of colored swatches can comprise a substantially solid color that is different from the substantially solid color of every other colored swatch. Further, the plurality of colored swatches can be arranged into the at least one solved pattern, which includes a correct placement of each of the colored swatches in relation to each other. Such a correct placement involves each respective colored swatch being adjacent within the solved pattern only to the other colored swatches that are closest in color to the respective colored swatch.

In various detailed embodiments, the at least one solved pattern can include a halation effect across its correctly placed colored swatches, and at least one or more of the unsolved arrangements do not include such a halation effect across its colored swatches. Also, each of the colored swatches can be bounded by substantially straight lines and/or be substantially the same shape as every other colored swatch. In addition, the at least one solved pattern can form an overall shape, and such overall shape can be the same as an overall shaped formed by one or more of the unsolved arrangements.

In various detailed embodiments, the colored swatches can include a plurality of primary parent color swatches and a plurality of child color swatches, such that the at least one solved pattern involves the plurality of primary parent color swatches being spaced apart from each other and the plurality of child color swatches being disposed between the plurality of primary parent color swatches. In such arrangements, the child color swatches between any two primary parent color swatches can provide a color gradient between the colors of the primary parent color swatches. Such a color gradient can be linear in nature from one primary parent color to another. In various embodiments, each of the plurality of individual colored swatches can form a square shape, and the at least one solved pattern can form an overall square shape. In such arrangements there can be four primary parent color swatches located in the corners of the overall square shape of the at least one solved pattern. Other individual swatch and/or overall pattern shapes are also possible, such as rectangles, triangles, hexagons, and so forth.

In various detailed embodiments, the puzzle apparatus can be a computing apparatus that includes a processor adapted to generate the puzzle, provide display output regarding the puzzle, and accept user input regarding the puzzle, as well as a display component coupled to the processor and adapted to present the puzzle to the user on the display region contained thereon, and also one or more input devices coupled to the processor and adapted to accept input from the user regarding the play of the puzzle. The processor can be further adapted to provide to the user an indication when the at least one solved pattern has been achieved and can also provide to the user a game score for arriving at the solved pattern. The processor can also be further adapted to provide the user with the ability to move a first of the colored swatches to the location of a second of the colored swatches. In such embodiments, the processor can also be adapted to relocate automatically the second colored swatch to another location to make space for the first colored swatch that is taking its place.

Further embodiments include various methods of presenting a puzzle using a puzzle apparatus. Pertinent process steps of such methods can include, for example, presenting to a user via a puzzle apparatus a plurality of colored swatches arranged in a first order that forms an unsolved pattern, allowing the user to rearrange the plurality of colored swatches from the first order to a second order that forms a solved pattern, and confirming to the user that the solved pattern has been achieved. As in the foregoing embodiments, each of the plurality of colored swatches can comprise a substantially solid color that is different from the substantially solid color of every other colored swatch. Also, the solved pattern can include a correct placement of each of the colored swatches therewithin, such that each respective colored swatch is adjacent within the solved pattern only to the other colored swatches from the plurality of colored swatches that are closest in color to the respective colored swatch.

In various detailed embodiments, the solved pattern can include a halation effect within its correctly placed second order of colored swatches. The unsolved pattern may not include a halation effect within its first order of colored swatches. Also, each of said plurality of colored swatches can be bounded by substantially straight lines and/or can be substantially the same shape as every other colored swatch. Additional process steps can include accepting from the user an input regarding selection of a difficulty level with respect to the difficulty of arriving at the solved pattern, and providing to the user an unsolved pattern of a complexity according to the selected difficulty level.

Still further embodiments include various computer readable media including at least computer program code for presenting a puzzle using a computing puzzle apparatus. Such a computer readable medium can include computer program code for performing any or all of the process steps provided in the foregoing method embodiments, as well as the various details provided therein. Additional embodiments involve systems that include the provided puzzle apparatus or computing apparatus, and any such apparatuses, systems, methods and the like can include any or all of the foregoing features in any combination.

Other apparatuses, systems, methods, features and advantages of the disclosure will be or will become apparent to one with skill in the art upon examination of the following figures and detailed description. It is intended that all additional apparatuses, systems, methods, features and advantages be included within this description, be within the scope of the disclosure, and be protected by the accompanying claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and arrangements for the disclosed inventive apparatuses, systems and methods for color sorting puzzle games. These drawings in no way limit any changes in form and detail that may be made to the disclosure by one skilled in the art without departing from the spirit and scope of the disclosure.

FIG. 13 illustrates an initial matrix for calculating the colors of individual swatches for an exemplary color sorting puzzle game according to one embodiment of the present disclosure.

DETAILED DESCRIPTION

Figure 1A:
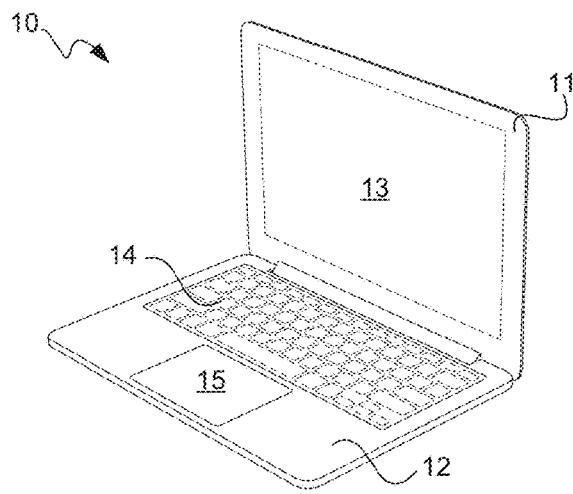
FIG. 1A illustrates in front perspective view an exemplary computing device according to one embodiment of the present disclosure.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to devices, systems and methods for providing, conducting and facilitating the play of color sorting puzzle games. Such color sorting puzzle games may be provided as physical items or pieces, as well as on one or more computing devices. As such, this disclosure may be applied to any form of presenting such color sorting puzzles or games, whether as physical items, virtually on a computing device, or otherwise. The various embodiments disclosed herein can be applied with respect to fully physical puzzles or games, electronic versions of such puzzles or games on individual computing devices or on entire systems involving multiple computing devices, various forms of computer readable media for such puzzles and games, as well as various methods of providing such puzzles and games.

Although the various examples set forth herein are focused on computerized versions of the disclosed puzzles and games, it will be readily understood that such puzzles and games can be played in a number of different ways and modes, such as with physical pieces or items, such that the disclosure is not limited only to computerized embodiments.

The provided color sorting puzzle games generally relate to arrangements of different colored cells or "swatches," where such colored swatches can be scrambled in order for a player or user to put them into a proper order or arrangement. The proper arrangement or solution can involve each colored swatch being adjacent to other swatches that are closest in color thereto, such that a visual harmonic effect is created. Such color sorting puzzle games can specifically be called "Huedoku," although other names and terminology may also be used. While the scrambled or unsolved arrangements of a Huedoku puzzle may present disjointed and unrelated color swatches or cells next to each other, a solved Huedoku puzzle can result in visual harmonic effects that are pleasing to the eye, such as simultaneous contrast, successive contrast, and halation, as described in greater detail below.

Referring first to FIG. 1A, an exemplary computing device according to one embodiment of the present disclosure is illustrated in front perspective view. Computing device 10, which can be a laptop computer, can be particularly adapted to provide various puzzles and games to a user, such as Huedoku, as provided herein. It will be readily appreciated that computing device 10 can be provided in numerous other configurations and formats while still being able to provide the disclosed puzzles and games, such that the provided laptop example is for illustrative purposes only. For example, computing device 10 could also be a desktop computer, tablet computer, smart phone, personal digital assistant, or the like.

In general, computing device 10 can include an upper portion 11 and a lower portion 12. Upper portion 11 can include a display component 13 having a display region thereupon, while lower portion 12 can include various input devices, such as a keyboard 14 and touchpad 15. Lower portion 12 may also include a processor (not shown) therewithin, which can be adapted to generate a puzzle or game, provide display output regarding the puzzle or game, and accept user input regarding the puzzle or game. Such a processor can be coupled to the display component 13 and the input devices 14, 15, as well as other components of the computing device. Such other computing device components or items not shown may also be included, as will be readily appreciated, with such items including, for example, speakers, memories, busses, input ports, disk drives, power supplies, wireless interfaces, and the like.

Figure 1B:
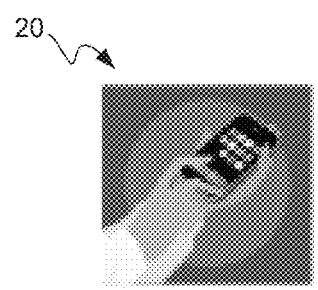
FIG. 1B illustrates in front perspective view an alternative exemplary computing device according to one embodiment of the present disclosure.

FIG. 1B illustrates in front perspective view an alternative exemplary computing device according to one embodiment of the present disclosure. Smart phone 20 can similarly be used to provide a Huedoku puzzle game or other similar color sorting puzzle or game. As in the foregoing computing device 10, smart phone 20 can include at least a processor, display component having a display region, and one or more input devices, such as a touchscreen, button(s) and/or a keypad. In various embodiments, a Huedoku puzzle game or the like can be provided as an application or "app" on an app store that can be accessed from smart phone 20. Such an app can be downloaded and then played or used on the phone 20.

Figure 1C:
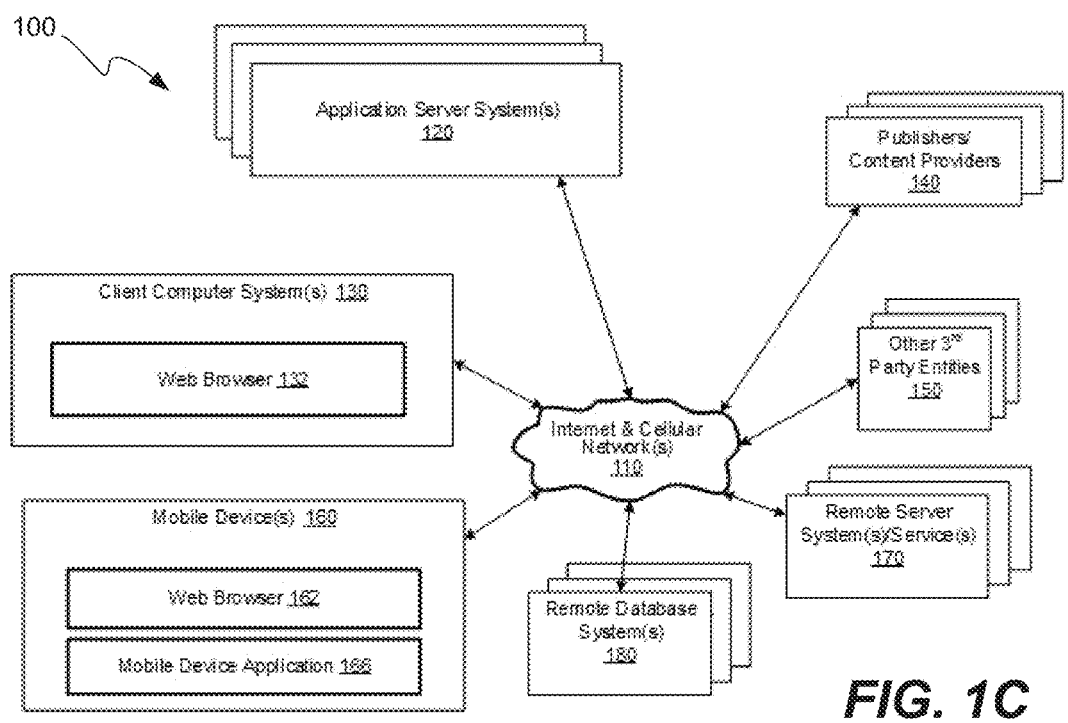
FIG. 1C illustrates in block diagram format an exemplary computerized data network according to one embodiment of the present disclosure.

FIG. 1C illustrates in block diagram format an exemplary computerized data network according to one embodiment of the present disclosure. Computerized data network 100 can be used to implement a "Huedoku Gaming System" adapted for the play of Huedoku and/or other similar color sorting puzzles or games, for example. As described in greater detail herein, different embodiments of Huedoku Gaming Systems may be configured, designed, and/or operable to provide various different types of operations, functionalities, and/or features generally relating to Huedoku and/or other similar color sorting puzzle or games. Further, as described in greater detail herein, many of the various operations, functionalities, and/or features of the Huedoku Gaming System disclosed herein may provide may enable or provide different types of advantages and/or benefits to different entities interacting with the Huedoku Gaming System.

According to different embodiments, at least some Huedoku Gaming Systems may be configured, designed, and/or operable to provide a number of different advantages and/or benefits and/or may be operable to initiate, and/or enable various different types of operations, functionalities, and/or features, According to different embodiments, at least a portion of the various types of functions, operations, actions, and/or other features provided by the Huedoku Gaming System may be implemented at one or more client systems, at one or more server systems, and/or combinations thereof.

According to different embodiments, the Huedoku Gaming System 100 may include a plurality of different types of components, devices, modules, processes, systems, and the like, which, for example, may be implemented and/or instantiated via the use of hardware and/or combinations of hardware and software. According to various embodiments, the computerized data network 100 adapted for implementation of a Huedoku Gaming System may include a plurality of different types of components, devices, modules, processes, systems, etc., which, for example, may be implemented and/or instantiated via the use of hardware and/or combinations of hardware and software. For example, as illustrated in the example embodiment of FIG. 1C, network 100 may include one or more of the following types of systems, components, devices, processes, etc. (or combinations thereof):

- Application Server System(s) 120—In at least one embodiment, the Application Server System(s) may be operable to perform and/or implement various types of functions, operations, actions, and/or other features such as those described or referenced herein.
- Publisher/Content Provider System component(s) 140
- Client Computer System (s) 130
- 3$^{rd}$ Party System(s) 150
- Internet & Cellular Network(s) 110
- Remote Database System(s) 180
- Remote Server System(s)/Service(s) 170, which, for example, may include, but are not limited to, one or more of the following (or combinations thereof):
  - Content provider servers/services
  - Media Streaming servers/services
  - Database storage/access/query servers/services
  - Financial transaction servers/services
  - Payment gateway servers/services
  - Electronic commerce servers/services
  - Event management/scheduling servers/services
- Mobile Device(s) 160—In at least one embodiment, the Mobile Device(s) may be operable to perform and/or implement various types of functions, operations, actions, and/or other features such as those described or referenced herein.

In at least one embodiment, a Huedoku Gaming System may be operable to utilize and/or generate various different types of data and/or other types of information when performing specific tasks and/or operations. This may include, for example, input data/information and/or output data/information. For example, in at least one embodiment, a Huedoku Gaming System may be operable to access, process, and/or otherwise utilize information from one or more different types of sources, such as, for example, one or more local and/or remote memories, devices and/or systems. Additionally, in at least one embodiment, a Huedoku Gaming System may be operable to generate one or more different types of output data/information, which, for example, may be stored in memory of one or more local and/or remote devices and/or systems. Examples of different types of input data/information and/or output data/information which may be accessed and/or utilized by a Huedoku Gaming System may include, but are not limited to, one or more of those described and/or referenced herein.

According to specific embodiments, multiple instances or threads of a Huedoku Gaming System may be concurrently implemented and/or initiated via the use of one or more processors and/or other combinations of hardware and/or hardware and software. For example, in at least some embodiments, various aspects, features, and/or functionalities of the Huedoku Gaming System may be performed, implemented and/or initiated by one or more of the various systems, components, systems, devices, procedures, processes, etc., described and/or referenced herein.

In at least one embodiment, a given instance of a Huedoku Gaming System may access and/or utilize information from one or more associated databases. In at least one embodiment, at least a portion of the database information may be accessed via communication with one or more local and/or remote memory devices. Examples of different types of data which may be accessed by a Huedoku Gaming System may include, but are not limited to, one or more of those described and/or referenced herein.

According to different embodiments, various different types of encryption/decryption techniques may be used to facilitate secure communications between devices in a Huedoku Gaming System and/or other networks. Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the Huedoku Gaming System may be initiated in response to detection of one or more conditions or events satisfying one or more different types of minimum threshold criteria for triggering initiation of at least one instance of the Huedoku Gaming System. Various examples of conditions or events which may trigger initiation and/or implementation of one or more different threads or instances of the Huedoku Gaming System may include, but are not limited to, one or more of those described and/or referenced herein.

It will be appreciated that the Huedoku Gaming System of FIG. 1C is but one example from a wide range of Huedoku Gaming System embodiments which may be implemented. Other embodiments of the Huedoku Gaming System (not shown) may include additional, fewer and/or different components/features that those illustrated in the exemplary Huedoku Gaming System embodiment of FIG. 1C. Generally, the various techniques for implementing a Huedoku game or similar color sorting puzzle or game described herein may be implemented in software, hardware and/or hardware+ software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Software, hardware and/or software+hardware hybrid embodiments of the Huedoku Gaming techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
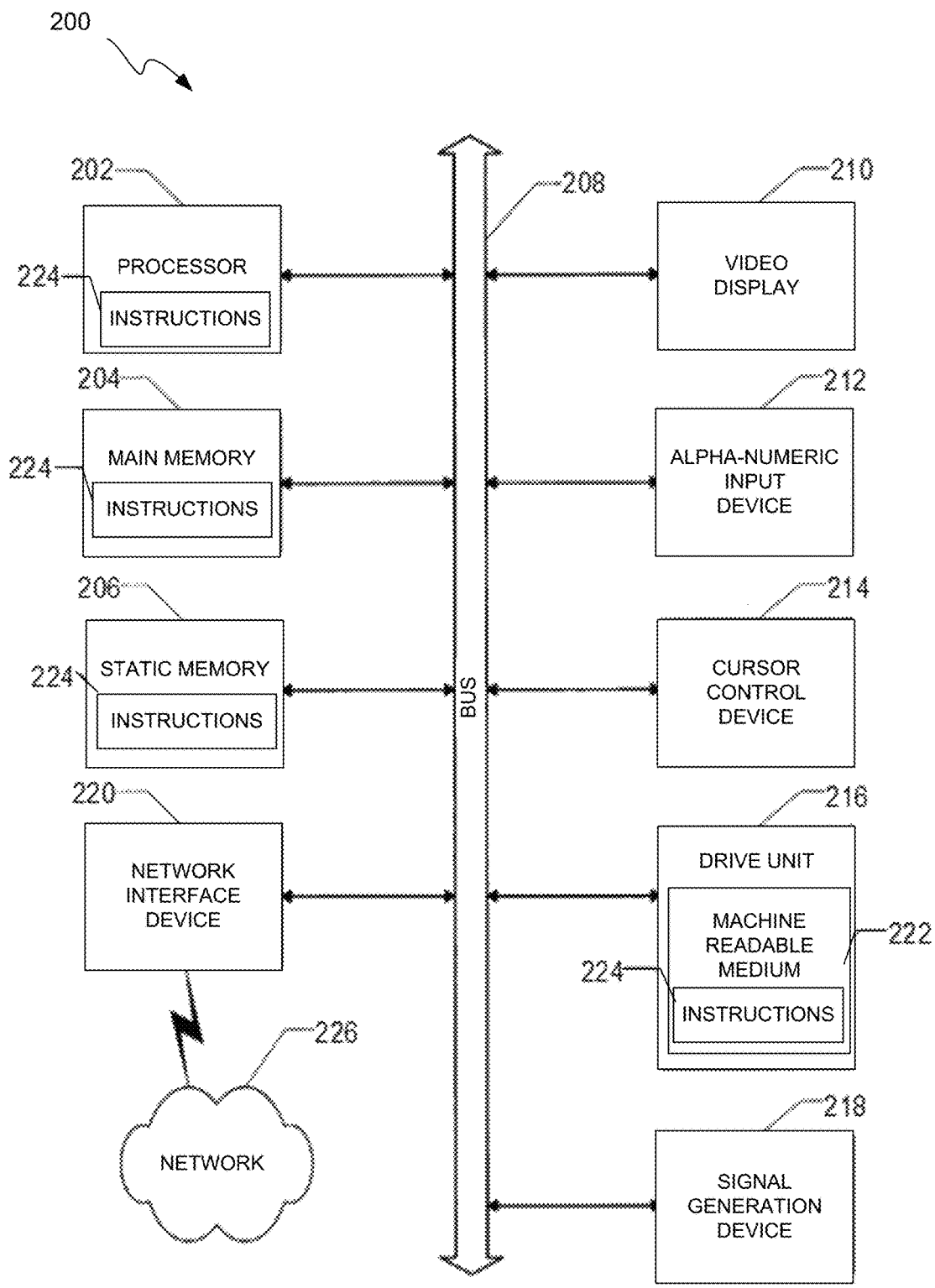
FIG. 2 illustrates a diagram of an exemplary client or end user computing device or system according to one embodiment of the present disclosure.

Turning next to FIG. 2, a diagrammatic representation of an exemplary client or end user computing device or system is provided. Computing device or system 200 can be identical or similar to any of the foregoing computer devices 10, 20, as well as any other suitable computing device or system adapted for providing the disclosed Huedoku or other color sorting games or puzzles.

Computing device or system 200 may contain a set of instructions for causing itself or another networked machine to perform any one or more of the methodologies discussed herein. As such, computing device or system 200 may operate as a standalone device or machine, or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Exemplary computer device or system 200 includes a processor 202 (e.g., a central processing unit (CPU), a graphics processing unit (GPU) or both), a main memory 204 and a static memory 206, which communicate with each other via a bus 208. The computer device or system 200 may further include a video display unit 210 (e.g., a liquid crystal display (LCD) or a cathode ray tube (CRT)), and also an alphanumeric input device 212 (e.g., a keyboard), a user interface (UI) navigation device 214 (e.g., a mouse), a disk drive unit 216, a signal generation device 218 (e.g., a speaker) and a network interface device 220. The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer device or system 200, wherein the main memory 204 and/or the processor 202 may also be constituting machine-readable media.

The software 224 may further be transmitted or received over a network 226 via the network interface device 220 utilizing any one of a number of well-known transfer protocols (e. g., HTTP). While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

According to various embodiments, computing device or system 200 may include a variety of components, modules and/or systems for providing various types of functionality. For example, in at least one embodiment, device or system 200 may include a web browser application which is operable to process, execute, and/or support the use of scripts (e.g., JavaScript, AJAX, etc.), Plug-ins, executable code, virtual machines, HTML5 vector-based web animation (e.g., Adobe Flash), etc. In at least one embodiment, the web browser application may be configured or designed to instantiate components and/or objects at the device or system 200 in response to processing scripts, instructions, and/or other information received from a remote server such as a web server. Examples of such components and/or objects may include, but are not limited to, UI components, database components, processing components, and other components that may facilitate and/or enable device or system 200 to perform and/or initiate various types of operations, activities, functions such as those described herein with respect to providing Huedoku or other similar puzzles or games.

Figure 3:
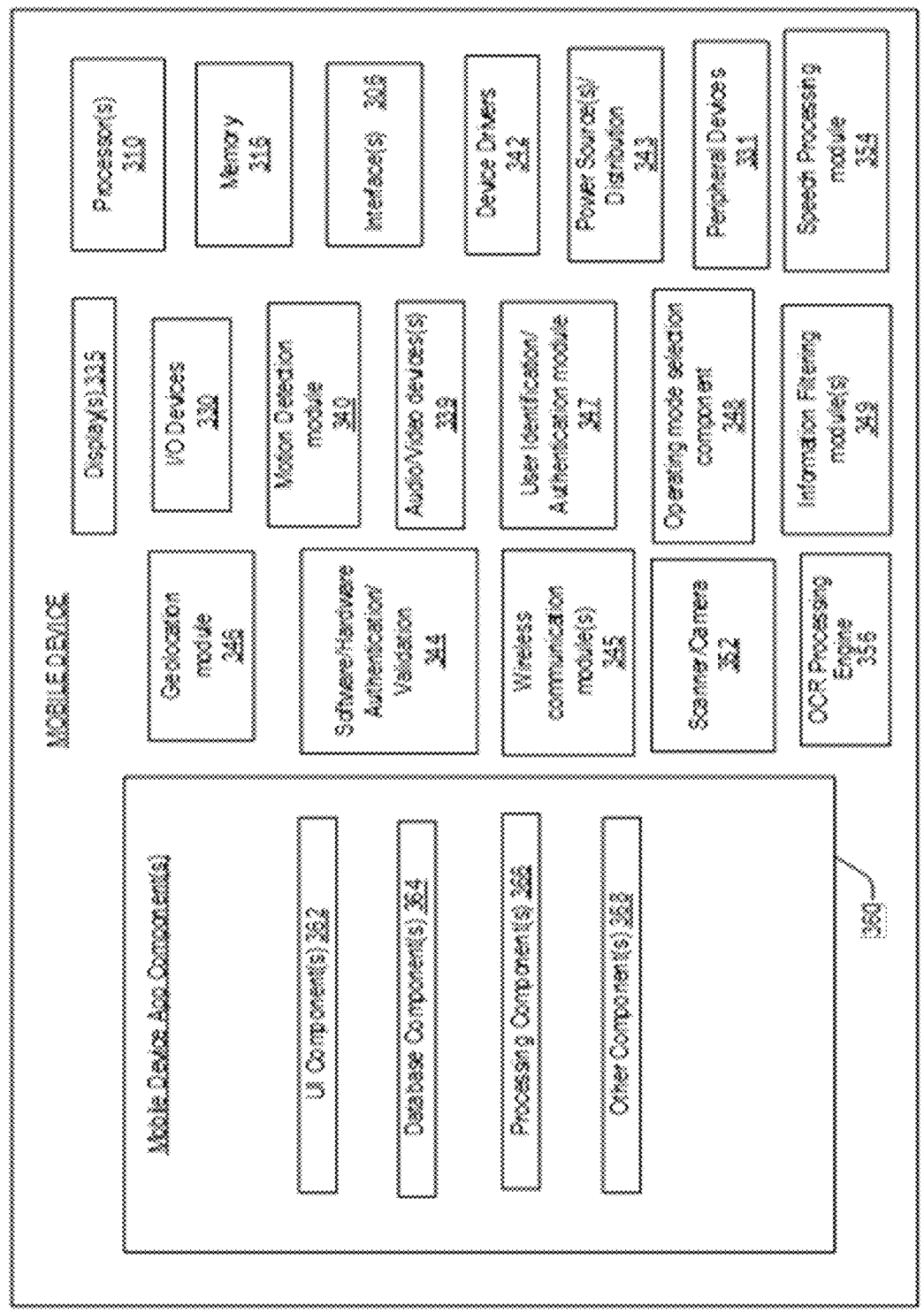
FIG. 3 illustrates in block diagram format an exemplary client system for a mobile device according to one embodiment of the present disclosure.

Continuing with FIG. 3, a block diagram of an exemplary client system for a mobile device is provided. In at least one embodiment, the mobile device client system 300 may include a Huedoku Mobile Device App Component, which has been configured or designed to provide functionality for enabling or implementing at least a portion of the various Huedoku gaming techniques at the mobile device client system. Such a mobile device app component can be provided for download by a service provider, such as an app store for smart phone devices. Various aspects, features, and/or functionalities of client system 300 may be performed, implemented and/or initiated by one or more of the following types of systems, components, systems, devices, procedures, processes, and the like. Such items can include, for example: Processor(s) 310, Device Drivers 342, Memory 316, Interface(s) 306, Power Source(s)/Distribution 343, Geolocation module 346, Display(s) 335, I/O Devices 330, Audio/Video devices(s) 339, Peripheral Devices 331, Motion Detection module 340, User Identification/Authentication module 347, Client App Component(s) 360, Other Component(s) 368, UI Component(s) 362, Database Component(s) 364, Processing Component(s) 366, Software/Hardware Authentication/Validation 344, Wireless communication module(s) 345, Information Filtering module(s) 349, Operating mode selection component 348, Speech Processing module 354, Scanner/Camera 352, and OCR Processing Engine 356, among other possible components.

As illustrated in the example of FIG. 3, mobile device 300 may include a variety of components, modules and/or systems for providing various functionality. For example, Mobile Device 300 may include Mobile Device Application components (e.g., 360), which, for example, may include, but are not limited to, one or more of the following (or combinations thereof): UI Components 362, Database Components 364, Processing Components 366, and Other Components 368 which, for example, may include components for facilitating and/or enabling the mobile device to perform and/or initiate various types of operations, activities, functions such as those described herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more different types of data, metadata, and/or other information described and/or referenced herein.

According to different embodiments, Mobile Device 300 may further include, but is not limited to, different types of components, modules and/or systems (or combinations thereof) such as, for example, one or more of the following.

- At least one processor 310. In at least one embodiment, the processor(s) 310 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

- Memory 316, which, for example, may include volatile memory (e.g., RAM), non-volatile memory (e.g., disk memory, FLASH memory, EPROMs, etc.), unalterable memory, and/or other types of memory. In at least one implementation, the memory 316 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various Huedoku gaming techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the Huedoku gaming techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

- Interface(s) 306 which, for example, may include wired interfaces and/or wireless interfaces. In at least one implementation, the interface(s) 306 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (Wi-Max), 802.22, Cellular standards such as CDMA, CDMA2000, WCDMA, Radio Frequency (e.g., RFID), Infrared, Near Field Magnetics, etc.

- Device driver(s) 342. In at least one implementation, the device driver(s) 342 may include functionality similar to at least a portion of functionality implemented by one or more computer system driver devices such as those described herein and/or generally known to one having ordinary skill in the art.

- At least one power source (and/or power distribution source) 343. In at least one implementation, the power source may include at least one mobile power source (e.g., battery) for allowing the client system to operate in a wireless and/or mobile environment. For example, in one implementation, the power source 343 may be implemented using a rechargeable, thin-film type battery. Further, in embodiments where it is desirable for the device to be flexible, the power source 343 may be designed to be flexible.

- Geolocation module 346 which, for example, may be configured or designed to acquire geolocation information from remote sources and use the acquired geolocation information to determine information relating to a relative and/or absolute position of the client system.

Motion detection component 340 for detecting motion or movement of the client system and/or for detecting motion, movement, gestures and/or other input data from user. In at least one embodiment, the motion detection component 340 may include one or more motion detection sensors such as, for example, MEMS (Micro Electro Mechanical System) accelerometers, that can detect the acceleration and/or other movements of the client system as it is moved by a user.

User Identification/Authentication module 347. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 335. According to various embodiments, such display(s) may be implemented using, for example, LCD display technology, OLED display technology, and/or other types of conventional display technology. In at least one implementation, display(s) 335 may be adapted to be flexible or bendable. Additionally, in at least one embodiment the information displayed on display(s) 335 may utilize e-ink technology (such as that available from E Ink Corporation, Cambridge, Mass., www.eink.com), or other suitable technology for reducing the power consumption of information displayed on the display(s) 335.

One or more user I/O Device(s) 330 such as, for example, keys, buttons, scroll wheels, cursors, touchscreen sensors, audio command interfaces, magnetic strip reader, optical scanner, etc.

Audio/Video device(s) 339 such as, for example, components for displaying audio/visual media which, for example, may include cameras, speakers, microphones, media presentation components, wireless transmitter/receiver devices for enabling wireless audio and/or visual communication between the client system 300 and remote devices (e.g., radios, telephones, computer systems, etc.). For example, in one implementation, the audio system may include componentry for enabling the client system to function as a cell phone or two-way radio device.

Other types of peripheral devices 331 which may be useful to the users of various client systems, such as, for example: PDA functionality; memory card reader(s); fingerprint reader(s); image projection device(s); social networking peripheral component(s); etc.

Information filtering module(s) 349 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 349 may also be adapted to display, in real-time, filtered information to the user based upon a variety of criteria such as, for example, geolocation information, contextual activity information, and/or other types of filtering criteria described and/or referenced herein.

Wireless communication module(s) 345. In one implementation, the wireless communication module 345 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 344 which, for example, may be used for authenticating and/or validating local hardware and/or software components, hardware/software components residing at a remote device, game play information, wager information, user information and/or identity, etc.

Operating mode selection component 348 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 352) which may be configured or designed for use in scanning identifiers and/or other content from other devices and/or objects such as for example: mobile device displays, computer displays, static displays (e.g., printed on tangible mediums), etc.

OCR Processing Engine (e.g., 356) which, for example, may be operable to perform image processing and optical character recognition of images such as those captured by a mobile device camera, for example.

Speech Processing module (e.g., 354) which, for example, may be operable to perform speech recognition, and may be operable to perform speech-to-text conversion.

Figure 4:
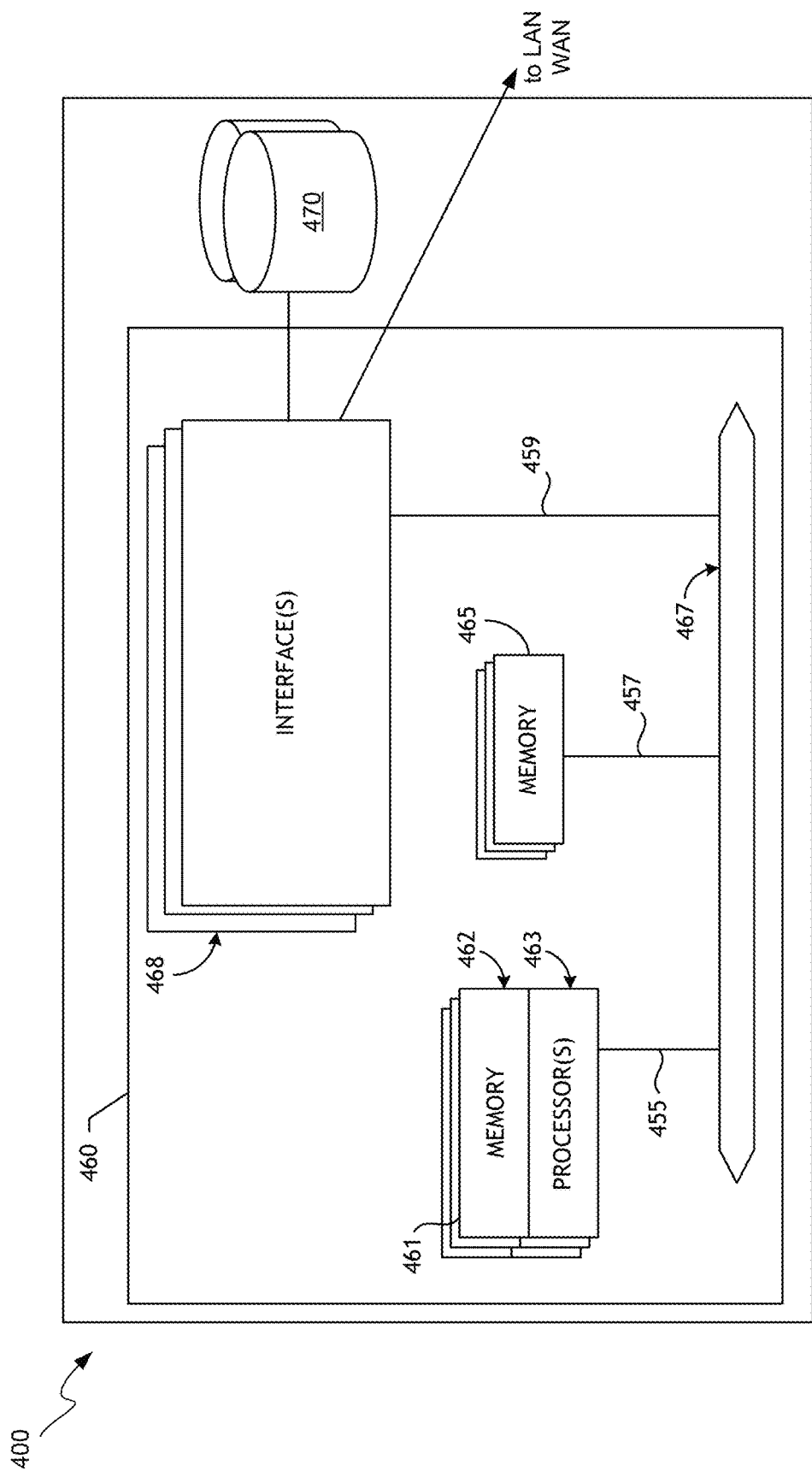
FIG. 4 illustrates in block diagram format an exemplary server system according to one embodiment of the present disclosure.

FIG. 4 illustrates in block diagram format an exemplary server system 480, which may be used for implementing various aspects/features described herein. In at least one embodiment, the server system 480 includes at least one network device 460, and at least one storage device 470 (such as, for example, a direct attached storage device). In one embodiment, server system 480 may be suitable for implementing at least some of the Huedoku gaming techniques described herein.

According to one embodiment, network device 460 may include a master central processing unit (CPU) 462, interfaces 468, and a bus 467 (e.g., a PCI bus). When acting under the control of appropriate software or firmware, the CPU 462 may be responsible for implementing specific functions associated with the functions of a desired network device. For example, when configured as a server, the CPU 462 may be responsible for analyzing packets; encapsulating packets; forwarding packets to appropriate network devices; instantiating various types of virtual machines, virtual interfaces, virtual storage volumes, virtual appliances; etc. The CPU 462 preferably accomplishes at least a portion of these functions under the control of software including an operating system (e.g. Linux), and any appropriate system software (such as, for example, AppLogic™ software).

CPU 462 may include one or more processors 463 such as, for example, one or more processors from the AMD, Motorola, Intel and/or MIPS families of microprocessors. In an alternative embodiment, processor 463 may be specially designed hardware for controlling the operations of server system 480. In a specific embodiment, a memory 461 (such as non-volatile RAM and/or ROM) also forms part of CPU 462. However, there may be many different ways in which memory could be coupled to the system. Memory block 461 may be used for a variety of purposes such as, for example, caching and/or storing data, programming instructions, etc.

The interfaces 468 may be typically provided as interface cards (sometimes referred to as "line cards"). Alternatively, one or more of the interfaces 468 may be provided as on-board interface controllers built into the system motherboard. Generally, they control the sending and receiving of data packets over the network and sometimes support other peripherals used with the server system 480. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

In at least one embodiment, some interfaces may be configured or designed to allow the server system 480 to communicate with other network devices associated with various local area network (LANs) and/or wide area networks (WANs). Other interfaces may be configured or designed to allow network device 460 to communicate with one or more direct attached storage device(s) 470.

Although the system shown in FIG. 4 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 465, which, for example, may include random access memory (RAM)) configured to store data, program instructions for the general-purpose network operations and/or other information relating to the functionality of the various Huedoku gaming techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 5:
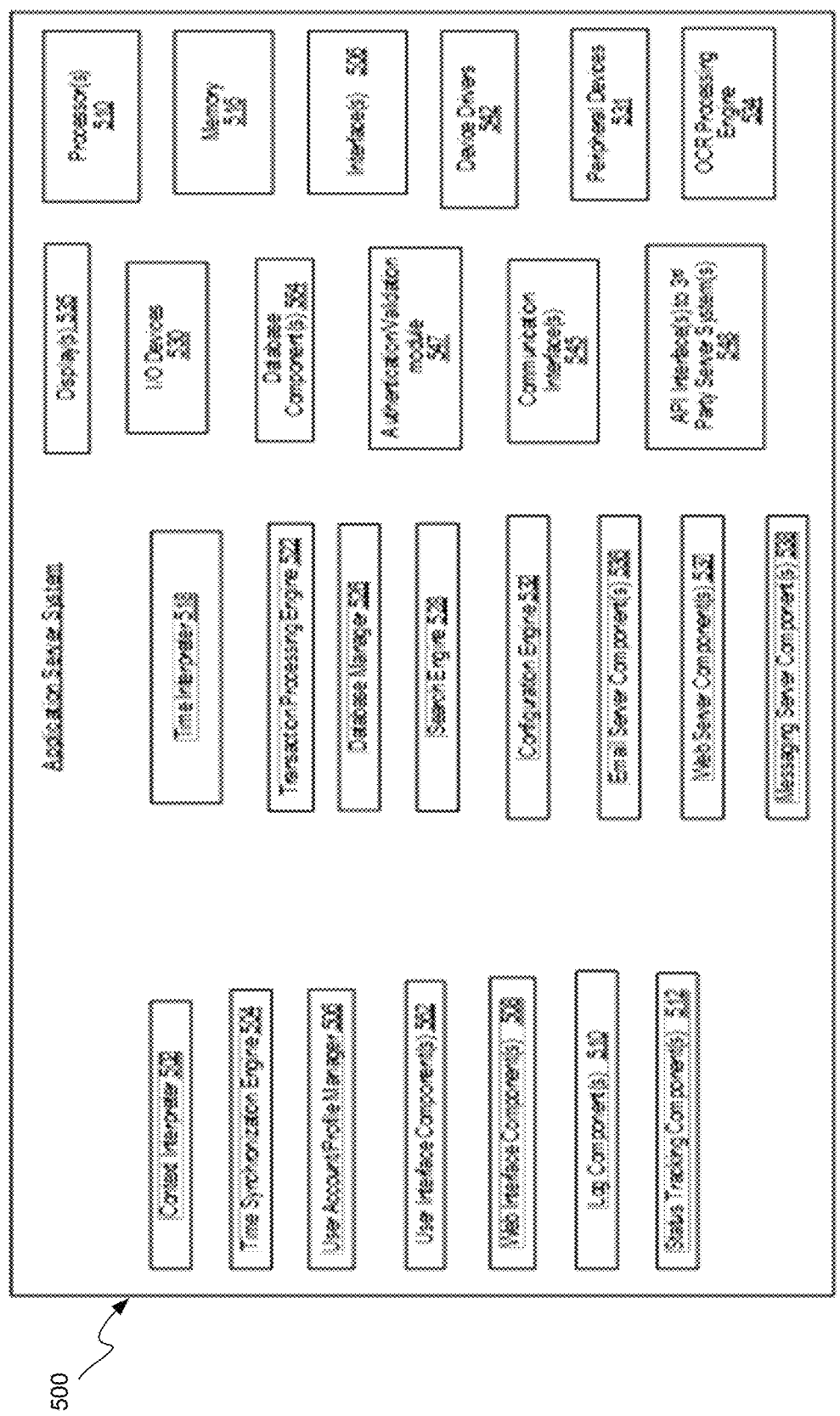
FIG. 5 illustrates in block diagram format an exemplary application server system according to one embodiment of the present disclosure.

FIG. 5 provides a block diagram of an application server system. Application server system 500 may be operable to perform and/or implement various types of functions, operations, actions, and/or other features associated with providing a Huedoku game or application. In at least one embodiment, application server system 500 may include a plurality of components operable to perform and/or implement various types of functions, operations, actions, and/or other features such as, for example:

Context Interpreter (e.g., 502) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof):

location-based criteria (e.g., geolocation of client device, geolocation of agent device, etc.)
time-based criteria
identity of user(s)
user profile information
transaction history information
recent user activities
proximate business-related criteria (e.g., criteria which may be used to determine whether the client device is currently located at or near a recognized business establishment such as a bank, gas station, restaurant, supermarket, etc.)

Time Synchronization Engine (e.g., 504) which, for example, may be operable to manages universal time synchronization (e.g., via NTP and/or GPS)

Search Engine (e.g., 528) which, for example, may be operable to search for transactions, logs, items, accounts, options in the Huedoku databases Configuration Engine (e.g., 532) which, for example, may be operable to determine and handle configuration of various customized configuration parameters for one or more devices, component(s), system(s), process(es), etc.

Time Interpreter (e.g., 518) which, for example, may be operable to automatically and/or dynamically modify or change identifier activation and expiration time(s) based on various criteria such as, for example, time, location, transaction status, etc.

Authentication/Validation Component(s) (e.g., 547) (password, software/hardware info, SSL certificates) which, for example, may be operable to perform various types of authentication/validation tasks such as, for example, one or more of the following (or combinations thereof):
  verifying/authenticating devices,
  verifying passwords, passcodes, SSL certificates, biometric identification information, and/or other types of security-related information
  verify/validate activation and/or expiration times
  etc.

In one implementation, the Authentication/Validation Component(s) may be adapted to determine and/or authenticate the identity of the current user or owner of the mobile client system. For example, in one embodiment, the current user may be required to perform a log in process at the mobile client system in order to access one or more features. In some embodiments, the mobile client system may include biometric security components which may be operable to validate and/or authenticate the identity of a user by reading or scanning The user's biometric information (e.g., fingerprints, face, voice, eye/iris, etc.). In at least one implementation, various security features may be incorporated into the mobile client system to prevent unauthorized users from accessing confidential or sensitive information.

Transaction Processing Engine (e.g., 522) which, for example, may be operable to handle various types of transaction processing tasks such as, for example, one or more of the following (or combinations thereof):
  identifying/determining transaction type
  determining which payment gateway(s) to use
  associating databases information to identifiers
  etc.

OCR Processing Engine (e.g., 534) which, for example, may be operable to perform image processing and optical character recognition of images such as those captured by a mobile device camera, for example.

Database Manager (e.g., 526) which, for example, may be operable to handle various types of tasks relating to database updating, database management, database access, etc. In at least one embodiment, the Database Manager may be operable to manage TISS databases, Huedoku Device Application databases, etc.

Log Component(s) (e.g., 510) which, for example, may be operable to generate and manage transactions history logs, system errors, connections from APIs, etc.

Status Tracking Component(s) (e.g., 512) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.

Gateway Component(s) (e.g., 514) which, for example, may be operable to facilitate and manage communications and transactions with external Payment Gateways.

Web Interface Component(s) (e.g., 508) which, for example, may be operable to facilitate and manage communications and transactions with Huedoku web portal(s).

API Interface(s) to Application Server System(s) (e.g., 546) which, for example, may be operable to facilitate and manage communications and transactions with API Interface(s) to Application Server System(s)

API Interface(s) to 3rd Party Server System(s) (e.g., 548) which, for example, may be operable to facilitate and manage communications and transactions with API Interface(s) to 3rd Party Server System(s)

OCR Processing Engine (e.g., 534) which, for example, may be operable to perform image processing and optical character recognition of images such as those captured by a mobile device camera, for example.

At least one processor 510. In at least one embodiment, the processor(s) 510 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 516, which, for example, may include volatile memory (e.g., RAM), non-volatile memory (e.g., disk memory, FLASH memory, EPROMs, etc.), unalterable memory, and/or other types of memory. In at least one implementation, the memory 516 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the Huedoku Gaming System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 506 which, for example, may include wired interfaces and/or wireless interfaces. In at least one implementation, the interface(s) 506 may include functionality similar to at least a portion of functionality implemented by one or more computer system interfaces such as those described herein and/or generally known to one having ordinary skill in the art.

Device driver(s) 542. In at least one implementation, the device driver(s) 542 may include functionality similar to at least a portion of functionality implemented by one or more computer system driver devices such as those described herein and/or generally known to one having ordinary skill in the art.

One or more display(s) 535. According to various embodiments, such display(s) may be implemented using, for example, LCD display technology, OLED display technology, and/or other types of conventional display technology. In at least one implementation, display(s) 535 may be adapted to be flexible or bendable. Additionally, in at least one embodiment the information displayed on display(s) 535 may utilize e-ink technology (such as that available from E Ink Corporation, Cambridge, Mass., www.eink.com), or other suitable technology for reducing the power consumption of information displayed on the display(s) 535.

Email Server Component(s) 536, which, for example, may be configured or designed to provide various functions and operations relating to email activities and communications.

Web Server Component(s) 537, which, for example, may be configured or designed to provide various functions and operations relating to web server activities and communications.

Messaging Server Component(s) 538, which, for example, may be configured or designed to provide various functions and operations relating to text messaging and/or other social network messaging activities and/or communications.

Figure 6A:
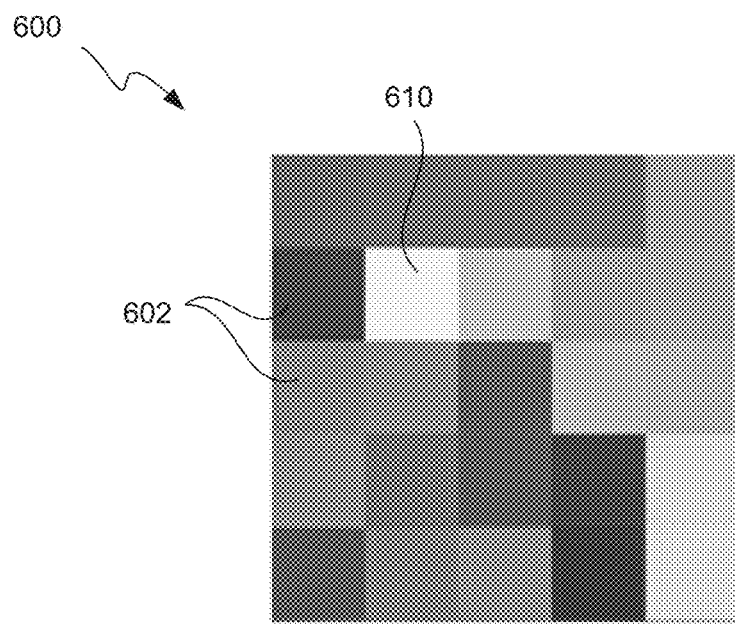
FIG. 6A illustrates an image of an exemplary unsolved arrangement for a color sorting puzzle game according to one embodiment of the present disclosure.
Figure 6B:
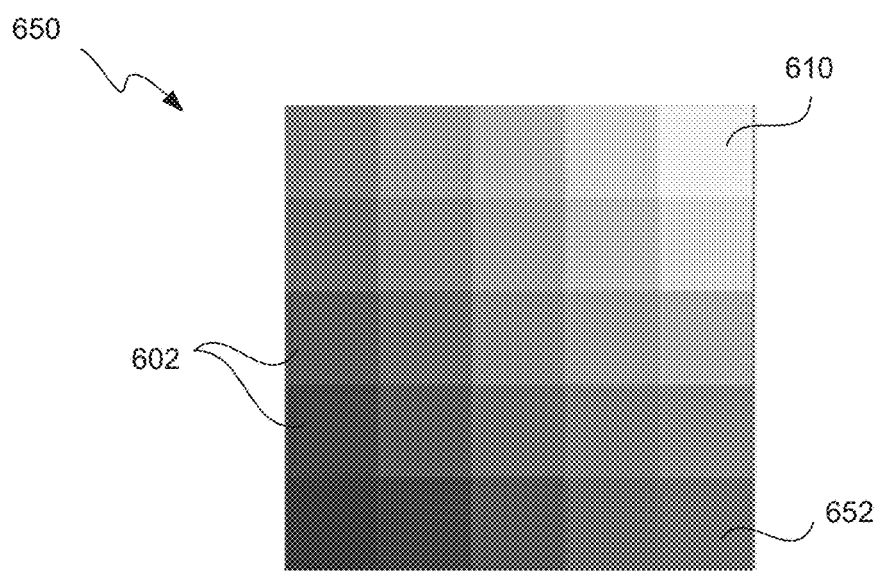
FIG. 6B illustrates an image of an exemplary solved pattern for the color sorting puzzle game of FIG. 6A according to one embodiment of the present disclosure.

Transitioning now to FIGS. 6A and 6B, various arrangements and patterns for an exemplary color sorting puzzle game will now be provided and explained. Again, such a color sorting puzzle game can be called a Huedoku, although other names and other puzzle or game variations can be used. FIG. 6A illustrates an unsolved arrangement 600 for a given color sorting puzzle game (e.g., Huedoku), while FIG. 6B illustrates a solved pattern or solution 650 for the same puzzle game or Huedoku of FIG. 6A. Unsolved Huedoku 600 can include a plurality of differently colored swatches 602 arranged into an overall pattern or shape. As shown, such an overall shape can be square in nature, although a rectangle, triangle, or other shape might also be used. Each colored swatch 602 can be a solid or substantially solid color that is different from the color of every other swatch, and each can have identical shapes. For example, each swatch 602 can also be square in nature, with the overall pattern forming a grid or matrix of colored swatches. As shown, a 5×5 grid or matrix can be used, although other sizes and amounts are also possible, such as 3×3, 4×4, 6×6, and so forth. Accordingly, there are 25 colored swatches 602 in unsolved arrangement 600.

The 25 colored swatches 602 in unsolved Huedoku arrangement 600 can be generally scrambled or randomized, and do not form any kind of discernable pattern. Conversely, these same 25 colored swatches 602 can be arranged to form a solved pattern 650 that has observable visible features. When arranged properly, at least some of colored swatches 602 will be in specific locations relative to other colored swatches. For example, there are exactly four corner swatches 652 in solved pattern 650, with all other colored swatches 602 then being located specifically with respect to these corner swatches. These corner swatches can contain "Primary Parent Colors," from which "Child Colors" for every other swatch are generated. To illustrate further that it is the same set of 25 colored swatches 602 contained in both unsolved arrangement 600 and solved pattern 650, a particular swatch 610 is designated in both arrangements. In unsolved arrangement 600, white swatch 610 is in a scrambled position, but in solved pattern 650 this same white swatch 610 is in its correct and proper position. It will be readily appreciated that a similar mapping could be made for the other 24 individual swatches 602 in both arrangements.

The overall unsolved arrangements and overall solved patterns can be called a "Huedoku Color Palette," which represents the overall shape of the Huedoku color sorting puzzle game. A Huedoku Color Palette can be a collection or set of color cells or swatches in which every color is in relationship to every other color. Each color is either a given primary parent color or is generated by multiple parent colors. Three or more primary parent colors are required to create a Huedoku Color Palette. Child colors are between the colors of parents on either side thereof, and can be a mathematical average of the parent colors. In many such Huedoku Color Palettes, child colors ascend or descend in equal steps between parent colors, with an equal change in color as a color swatch tends towards the parent to which it is nearest. "Primary Parent Colors" generate the "Child Colors." The Child Color cells or swatches in the Huedoku Color Palette inherently have the color characteristics (e.g., hue, value, saturation) of two or more of the Primary Parent Colors. In general each colored swatch within a Huedoku Color Palette can be said to be in an original and proper state (i.e., solved) when each colored swatch is adjacent to the same color swatch as when the Palette was originally created.

Solved pattern 650 can result in noticeable overall visual effects that are not apparent or inherent to the unsolved arrangement 600. The visual harmonic effect of a Huedoku Color Palette in its original and proper order, in which each cell of color is in relationship with every other cell of color and placed adjacent to its proper neighbor, occurs as a result of color phenomena that occurs due to universal human color perception. Such aspects of human visual perception can include simultaneous contrast, successive contrast and halation. For example, solved pattern 650 exhibits halation across its entire Huedoku Color Palette (up to the boundaries or "end conditions" created by the four Primary Parent Colors), due to every colored swatch being in a correct location. Depending upon location with respect to other swatches or components, halation may or may not occur in primary parent colors in other color arrangements. Further aspects of halation are set forth in greater detail below.

Figure 7:
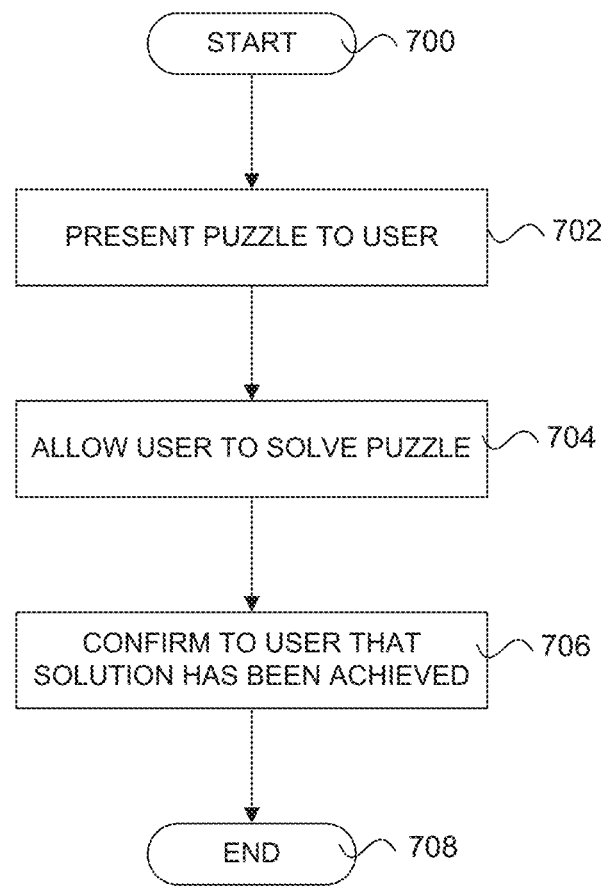
FIG. 7 provides a flowchart of an exemplary method of providing a puzzle to a user according to one embodiment of the present disclosure.

Referencing FIG. 7, a flowchart of one exemplary method of providing such a color sorting puzzle game to a user is illustrated. After a start step 700, a suitable puzzle is presented to a user at a process step 702. At a following process step 704, the user is allowed to solve the puzzle presented in the previous step. At a subsequent process step 706, some form of confirmation is given to the user that a solution to the puzzle has been achieved. Such a confirmation can be by way of, for example, one or more sounds, highlights, animations, or the like. The method then ends at end step 708.

For the foregoing flowchart, it will be readily appreciated that not every method step provided is always necessary, and that further steps not set forth herein may also be included. For example, added steps can involve proving software or game pieces, allowing a difficulty setting, and/or providing a user score for the game performance, among other possible steps. Furthermore, the exact order of steps may be altered as desired, and some steps may be performed simultaneously. For example, steps 702 and 704 can be considered as being performed simultaneously in various embodiments. Not all steps are always necessary either. For example, step 706 may not be performed in all embodiments. Also, while the provided examples are with respect to computerized puzzles or games, it will be readily appreciated that the provided methods can also be used with respect to physical pieces or games, as well as other alternative embodiments.

Furthermore, some process steps or details thereof may involve providing various visual effects as part of the puzzle game or solution. Such visual effects can include halation, for example. In general, halation is an artistic term describing a visual phenomenon that stimulates human eyes to experience a halo or glow across related colors appearing as a color gradation. Halation can result from various contrast effects, including simultaneous contrast, which occurs where the colors of different objects affect each other. Due to simultaneous contrast, color is relative in human perception, which allows for phenomena such as halation.

FIGS. 8A-8D illustrate various images containing exemplary visual examples of halation. For example, each of shape arrangements 800, 810, and 820 presents a separate halation example. In these examples of FIG. 8A, the smaller rectangles, 801, 811, and 821 respectively, are duplicated and contained within the larger rectangle pairs, 802-803, 812-813, and 822-823 respectively. As can be seen, although each of the duplicated smaller rectangles (e.g., 801) are the same matching colors, the two different rectangles have a different appearance to the human eye depending upon the contrast of the larger rectangles (e.g., 802-803) that surround them. The color of a given small rectangle appears pushed or biased towards the complementary color of the larger surrounding rectangle.

Also as a result of simultaneous contrast, halation occurs when three or more colors are immediately adjacent and in relationship. Such a halation phenomenon can be seen in a Huedoku as well. In such arrangements with more than three colors that are all in relation with each other, halation can appear as a gradient of color across the various multiple colors, such as the children colors. In solved arrangements, such a color gradient can be visually perceived across a single solid colored swatch, even though there is in fact no gradient across that individual swatch. The effect is due to the relational contrasts created with the other neighboring colored swatches. In this context, halation appears as a gradient of color that is an optical illusion appearing across what is actually a purely solid color. This is noticeable when such a solid color is adjacent to immediate neighboring colors that, when mixed, create that original solid color. Such an effect can be particularly noticeable when there are no borders or separations with the immediate neighboring colors. Overall collections of colors suddenly appear harmonious in taking on the appearance of an overall color gradation. Such a halation effect across solid colored swatches in this context can be seen in the overall solved pattern 650 of FIG. 6B, for example.

Figure 8A:
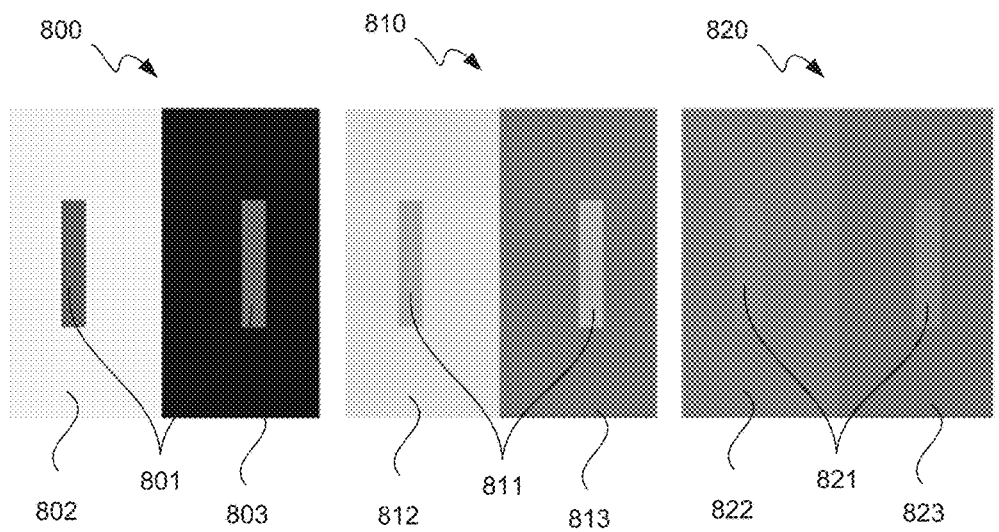
FIGS. 8A-8D illustrate various images containing exemplary visual examples of halation according to one embodiment of the present disclosure.
Figure 8B:
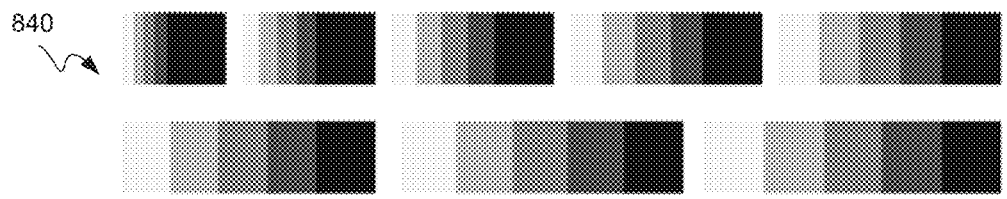
Figure 8C:
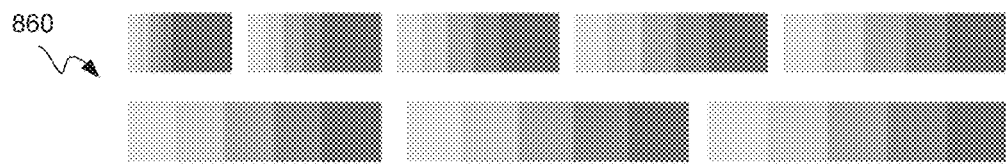
Figure 8D:

Halation occurs for color, and also for hue. Color includes black and white. FIGS. 8B and 8C depict further simple images containing visual examples of halation across five solid colored swatches each. In image set 840, the five colored swatches in each separate image range in color from light grey to dark grey, with the three "child" swatches in the middle being perfect steps of mixed color derived from the two "parents" on the outsides. Similarly, image set 860 contains separate images each having five colored swatches that range in color from yellow to orange. In each of the separate five swatch images from image sets 840 and 860, halation is experienced across the arrangements. Similarly, image set 880 of FIG. 8D also contains separate images each having five colored swatches that range in hue from lavender to pink. Halation is also experienced across each of these arrangements due to the gradations of hue.

Figure 9A:
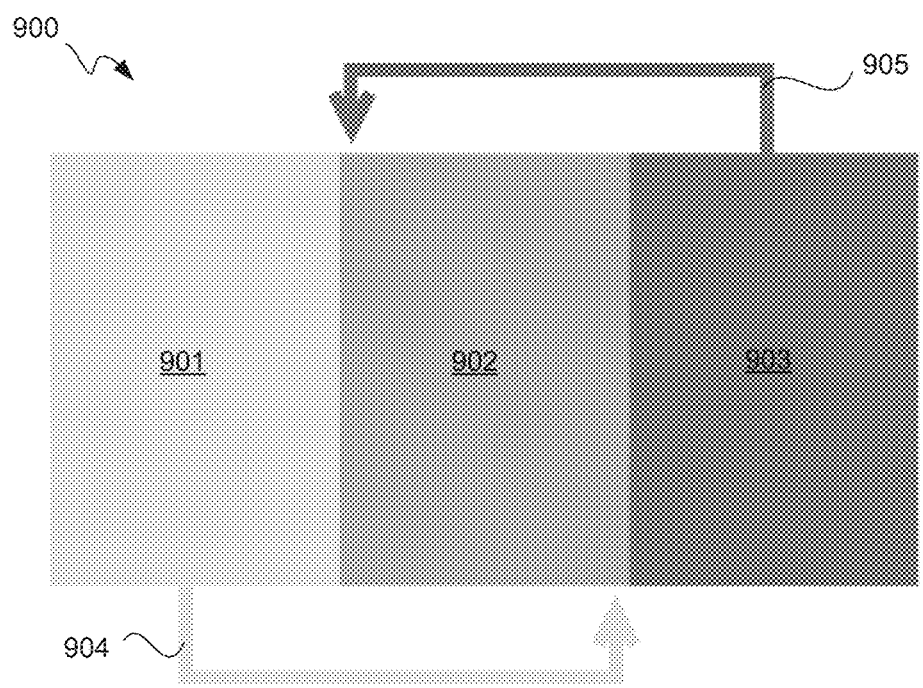
FIGS. 9A-9C illustrate a series of images containing further exemplary visual examples of halation according to one embodiment of the present disclosure.
Figure 9B:
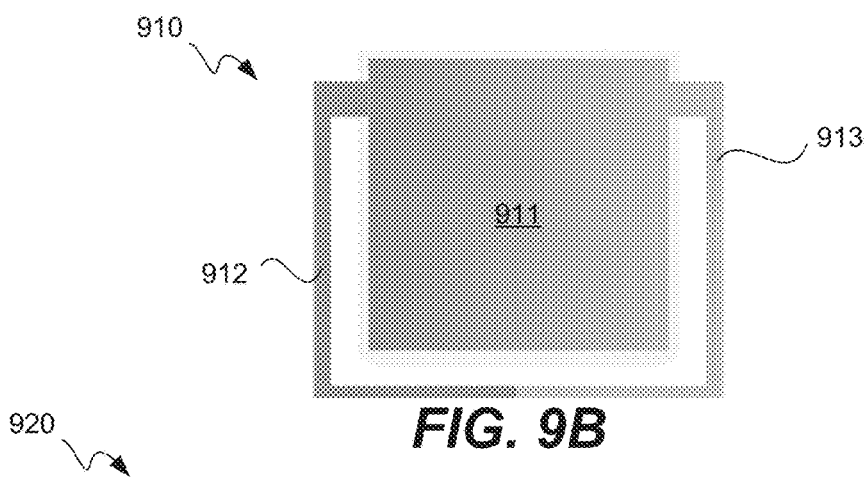
Figure 9C:
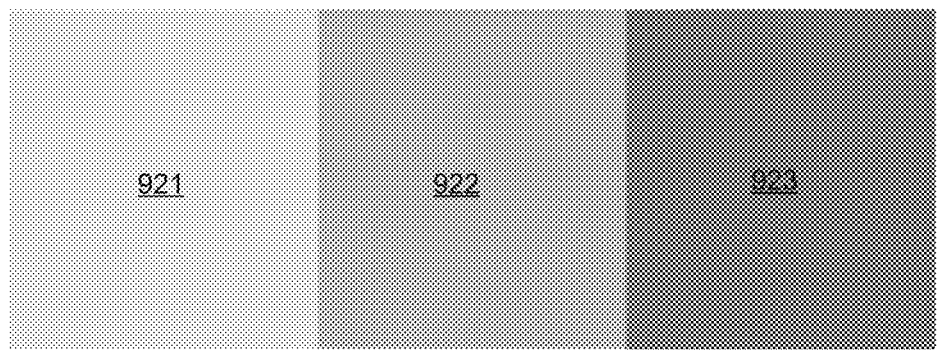

Continuing with FIGS. 9A-9C, a series of images containing further exemplary visual examples of halation is provided. In arrangement 900 of FIG. 9A, three solid colored swatches 901, 902, 903 are provided. Orange swatch 902 is an exact mix of the yellow swatch 901 and red swatch 903 on opposite sides thereof. Here, the yellow and the red swatches are the "parents," while the orange swatch is the "child." When looking at this particular color array 900, the middle color 902 will begin to take on aspects of the two parent colors 901, 903. The longer one looks at the orange, the greater the halation in many cases. As indicated by 904, a little bit of the yellow is often perceived to show up on the right side of the orange. Similarly as indicated by 905, a little bit of the red is often perceived to show up on the left of the orange. Such a halation effect is a component of human visual perception, and not necessarily the measurable reality of the colors that are actually at a given location.

Arrangement 910 of FIG. 9B depicts an image of actual color gradation across a single swatch. Color swatch 911 is not a substantially solid color in reality, but actually ranges from a lighter more yellowish orange 913 on the right side to a darker more reddish orange 912 on the left side. The contrast in these two colors at the edge of the swatch can be compared by the graphic underlying the swatch. Varying color swatch 911 is what is often represented in human perception when looking at solidly colored swatch 922 in arrangement 920 of FIG. 9C. Here, again there are three swatches, 921, 922, 923 placed side by side, with the orange swatch 922 in the middle. Although swatch 922 can be verified as a solid color when viewed in isolation, this same solid orange swatch 922 often takes on the characteristics of varying color swatch 911 when it is focused on with swatches 921 and 923 right next to it. Again, this is due to illusions in human visual perception based upon contrasts with differently colored neighboring items.

This visual perception effect of halation can be a significant component in a Huedoku color sorting puzzle game. For such a halation to be more noticeable or pronounced in some cases, it is often effective to put colors in an array where child colors are a mixture between two parent colors. Although an even mix can be preferable in some cases, a mixture weighted in favor of one parent can still result in halation that is biased in a particular direction. In addition, such a halation effect can be more noticeable or pronounced where the swatches or other colored objects are actually touching each other with little to no borders or separation therebetween. Although features such as mixtures of parent colors to form child colors and little to no borders or separation are preferred, it is also contemplated that some lesser amount of halation may also be perceived where there are colors that are slightly off and/or where there are small amounts of borders or separation between differently colored swatches or elements.

Figure 10A:
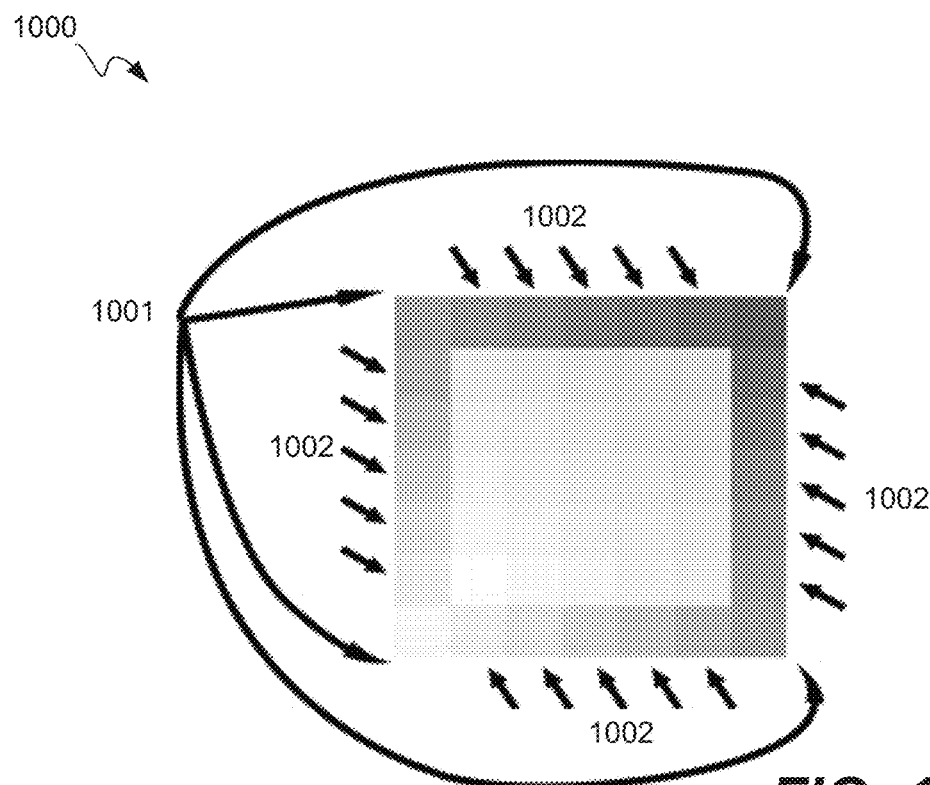
FIG. 10A illustrates an image highlighting primary parent color swatches and corresponding child color swatches for an exemplary color sorting puzzle game according to one embodiment of the present disclosure.

Transitioning now to FIG. 10A, an image highlighting primary parent color swatches and corresponding child color swatches for an exemplary color sorting puzzle game is shown. In general, a "parent color" (including but not necessarily a "primary parent color") is in relationship to another parent color because the characteristics (RGB, HSB, or other color model) are used to generate one or more than one child color together with another parent color. A child color is in relationship because two or more parents generate the child color therebetween. In Huedoku Color Palette 1000, every solid color swatch is in relation with every other solid color swatch to form a solved pattern. Primary parent colors 1001 are the source colors that are used to blend or form all of the other colors in the palette or overall pattern. Primary parent colors can be thought of as the original given colors for a given color sorting puzzle or puzzle game as set forth herein. For a square or rectangular puzzle, such as color sorting puzzle 1000, there can be four primary parent colors that are located at the corner swatches of the puzzle.

All swatches along the outer sides of the puzzle 1000 can then be child colors 1002 that are obtained based upon the primary parent colors 1001. Since Huedoku Color Palette or color sorting puzzle 1000 is a 7×7 square puzzle, that would mean 5 child color swatches 1002 between each pair of primary parent color swatches 1001. In a linear gradation of colors from one primary parent color swatch 1001 to another 1001, a progression for each child color swatch 1002 therebetween could be ⅙ of the way toward the other parent color. Those of skill in the art will readily appreciate how to transition or gradate on a percentage or fractional basis from one color or hue to another, such that virtually any different colors and hues can be set as for the initial primary parent colors, with the calculation of child colors then flowing logically as a result of such initial settings.

Figure 10B:
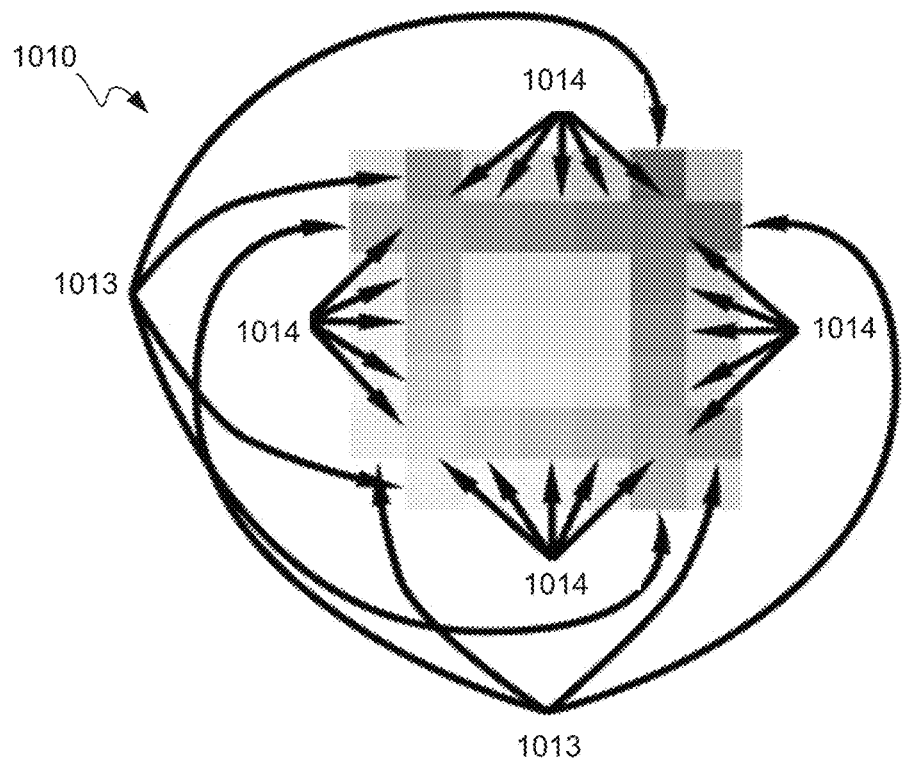
FIG. 10B illustrates an image highlighting secondary parent color swatches and corresponding child color swatches for an exemplary color sorting puzzle game according to one embodiment of the present disclosure.

Continuing with FIG. 10B, another image highlighting secondary parent color swatches and corresponding child color swatches for an exemplary color sorting puzzle game is provided. Palette 1010 is substantially similar to palette 1000 of FIG. 10A, only with different portions highlighted and labeled. Here, swatches 1013 are designated as the parent swatches, while swatches 1014 are the child swatches are those that are located therebetween having colors that are generated by the colors of the parent swatches 1013. It will be appreciated that while parent swatches 1013 are considered parents in highlighted palette 1010, these same swatches are child swatches 1002 in palette 1000. These parent swatches 1013, however, are not primary parent swatches. Such a designation is reserved for the original swatch colors from which all other swatch colors are derived. Rather, parent swatches 1013 can be considered secondary parent swatches.

In fact, any swatch can be a "parent swatch" in a secondary sense for purposes of determining the color of another child swatch. That is, while swatches 1002 are child swatches having their colors determined by primary parent swatches 1001, these same swatches can then be used as secondary parent swatches 1013 for determining the colors of other child swatches 1014. Such a process can then continue, with child swatches 1014 later being used to determine the colors of other child swatches, and so forth. In many embodiments, any swatch that is between two or more other swatches can be considered a child swatch of the swatches that it is between.

Figure 11:
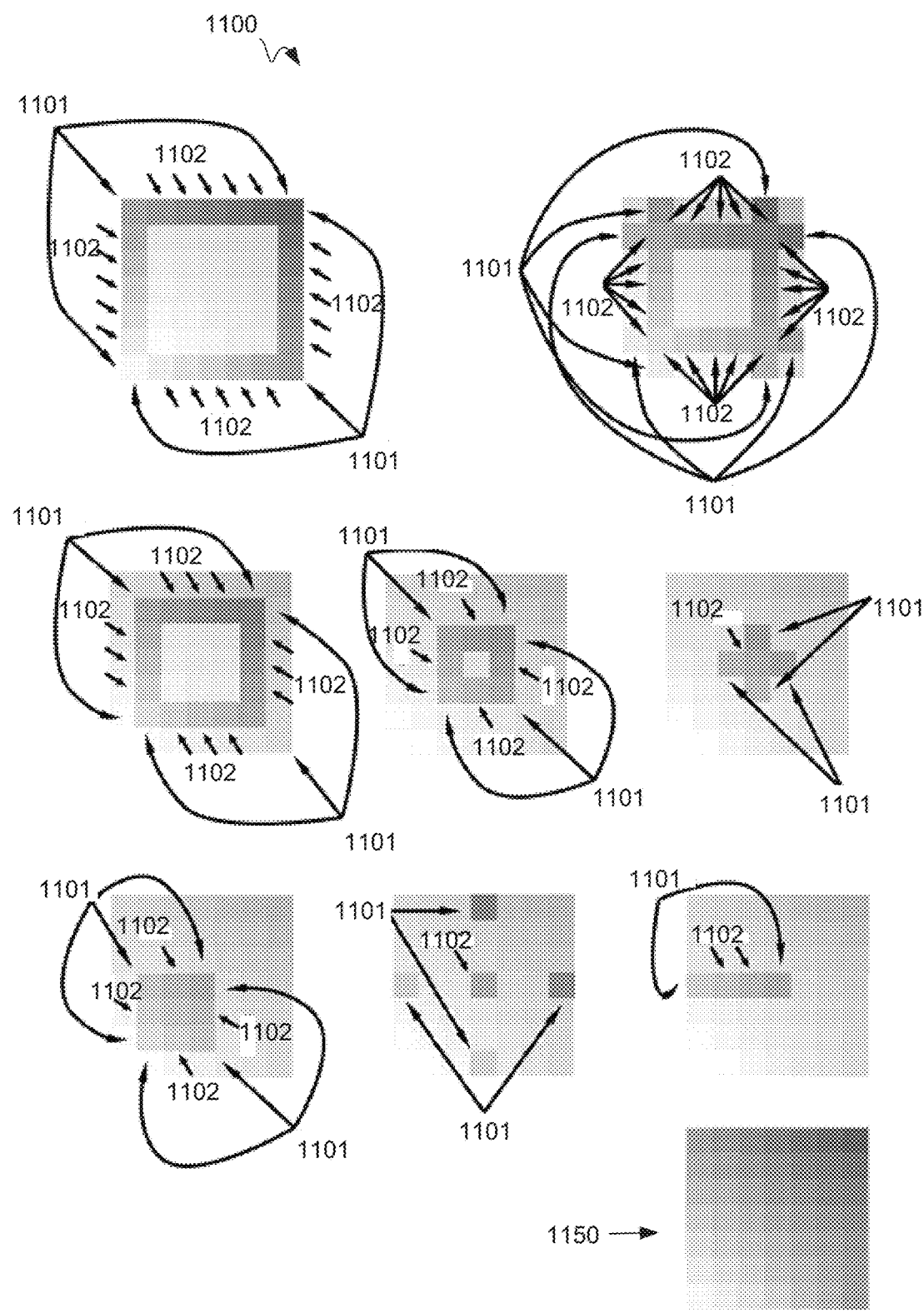
FIG. 11 illustrates various images highlighting various primary and secondary parent color swatches and corresponding child color swatches for an exemplary color sorting puzzle game according to one embodiment of the present disclosure.

Such a concept is illustrated in FIG. 11, which provides various images highlighting primary and secondary parent color swatches and corresponding child color swatches for an exemplary color sorting puzzle game. In general, each image shows parent swatches 1101 for which child swatches 1102 are formed therebetween. As explained above, only the first image highlights primary parent swatches (i.e., at the overall corners) as the parent swatches 1101, while every other image highlights secondary parent swatches as the parent swatches 1101. An overall fully highlighted representation of the subject 7×7 huedoku color palette 1150 is also provided for reference.

Again, the math used to create the proper color steps to give color to each colored swatch can derive from various standard color models, including, but not limited to RGB (Red Blue Green), HSB (Hue Saturation Brightness), CMYK (Cyan Magenta Yellow Black), or hexadecimal values that correspond to an RGB model, among other possible models and color arrangements. Examples for such math can be provided in grey scale for purposes of simplicity. For such a model, "K" can represent the amount of darkness from 0 to 100, with 0 being fully white and 100 being fully black. Every other value from 1 to 99 represents a 1/100 linear progression from white to black.

Figure 12A:
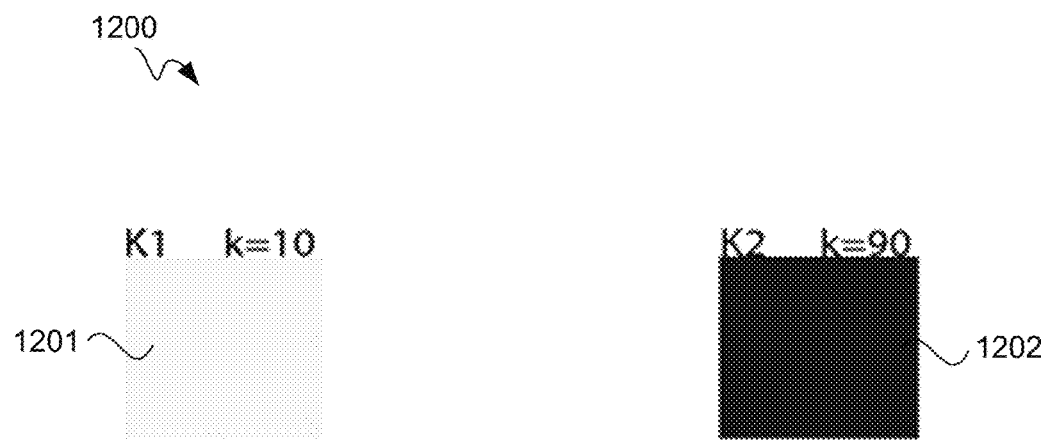
FIG. 12A illustrates an image of an exemplary pair of parent color swatches according to one embodiment of the present disclosure.
Figure 12B:
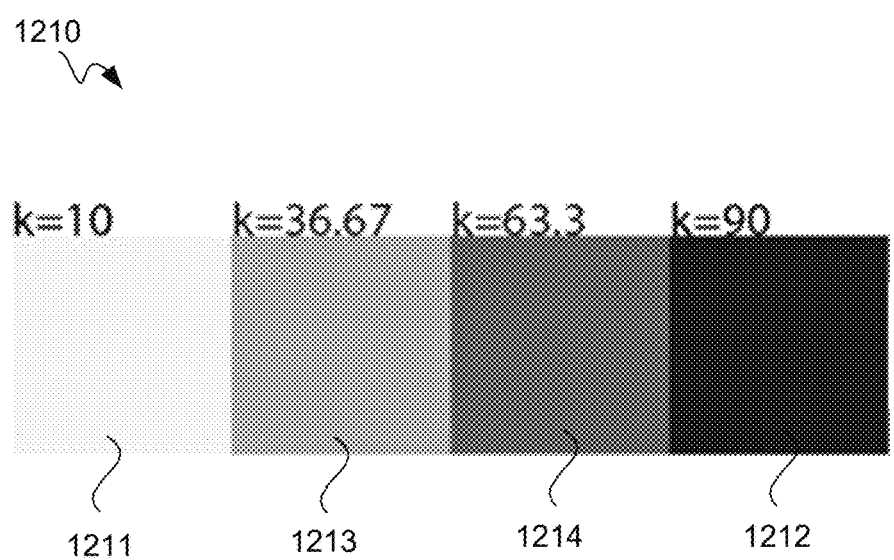
FIG. 12B illustrates an image of an exemplary plurality of corresponding child color swatches located between the pair of parent color swatches of FIG. 12A according to one embodiment of the present disclosure.

Referencing FIG. 12A an image of an exemplary pair of parent color swatches is shown. In arrangement 1200, substantially solid color swatch 1201 has a "K1" value of 10, while substantially solid color swatch 1202 has a "K2" value of 90, again both on a grey scale of 1 to 100. FIG. 12B shows an image of two exemplary corresponding child color swatches located between a pair of parent color swatches, such as those of FIG. 12A. In arrangement 1210, again one parent swatch 1211 has a k value of 10, and another parent swatch 1212 has a k value of 90. The k value colors of child swatches 1213, 1214 located therebetween are then between the values of 10 and 90. In addition, these k value colors form a progression from 10 to 90, such that the k value for 1213 is less than the k value for 1214. In this manner, the colors form a progression from 1211 to 1212.

In some embodiments, the k values (or other color values, such as hue, saturation, tint, etc.) are simply between the values on either side of each swatch, such that there is a progression across multiple swatches. In some embodiments, such a progression can be linear in nature, so as to provide a smooth contrast and halation effect across a whole array of swatches or color tiles. For example, the k values of child color swatches 1213 and 1214 can be calculated precisely to reflect such a linear gradation or progression. In such an arrangement, ⅓ of the way from 10 to 90 is 36.67, while ⅓ of the way again is 63.33. As such, swatches 1213 and 1214 can be assigned k values of 36.67 and 63.33 respectively for a linear gradation across all four swatches. As will be readily appreciated, fewer or more child swatches may be present, with corresponding adjustments to the math in calculating the color of each child swatch correspondingly taking place.

In general, the math used to calculate the k values for each of the child swatches above is as follows. With K1 and K2 given for the parent swatches or cells, we then count the number of children between them. This can also be called steps between. In this example, we are creating two children for a total number of 4 color cells in the array or family. The stepping value is next calculated for this array (of 4). If K1<K2, then the stepping value is calculated: (K2−K1)/(number of child cells in family+1). If K1>K2, then the stepping value is calculated as: (K1−K2)/(number of child cells in family+1). If K1=K2 then K=K1. The child closest to Parent1 (K1) is incrementally shifted by the value of the stepping factor towards Parent2 (K2). In this example, K1<K2, and the number of children in the family is 2. Therefore, (90−10)/(2+1)=80/3=26⅓. The stepping value can be rounded as desired, such as, for example, Stepping Value=26.67. If Parent1>Parent2 then Child1=K1−(stepping value), Child2=K1−(2*stepping factor), and so forth. But, if Parent2<Parent1 then Child1=K1+−(stepping value), Child2=K1+(2*stepping factor), and so forth. In this manner, the arrived at results are 10, 36.67, 63.33, and 90.

Using these basic principles to determine colors for child cells or swatches, an entire Huedoku Color Palette can be determined based only on the original primary parent colors. While a standard color array, such as that which is found in FIG. 12B, can be generated from only two primary parent colors, a Huedoku Color Palette includes more than one color array and thus is generated by more than two primary parent colors. To create a Huedoku Color Palette, one or more parents are added to an array. When there are three or more primary parent colors used to create a Huedoku Color Palette, then the color values for the children can be calculated between the nearest primary parent colors. For example, in a square or rectangular Huedoku Color Palette, then four primary parent colors can be used, with each being located in an overall corner of the palette, arrangement, or pattern. In addition, a particular color model can be used to calculate all child colors, such as, for example, an RGB color model.

The next four figures provide a progression for generating or calculating the colors for a Huedoku Color Palette. Turning next to FIG. 13, an initial matrix 1300 for calculating the colors of individual swatches for an exemplary color sorting puzzle game is provided. As shown, four primary parent colors can be provided in terms of RGB for each, for example, r1g1b1, r2g2b2, r3g3b3, r4g4b4, which can be assigned to the four corner swatches or cells in the matrix 1300. These primary parent colors can be randomly generated or provided by way of any number of means. In various embodiments, one or more primary parent colors can be selected or preferred by a player, for example. Different "skins" or game themes may involve the use of similar sets of primary parent colors, as given by a game provider or designer. The number of children swatches or cells can then be determined both horizontally and vertically along the matrix or grid.

Figure 14A:
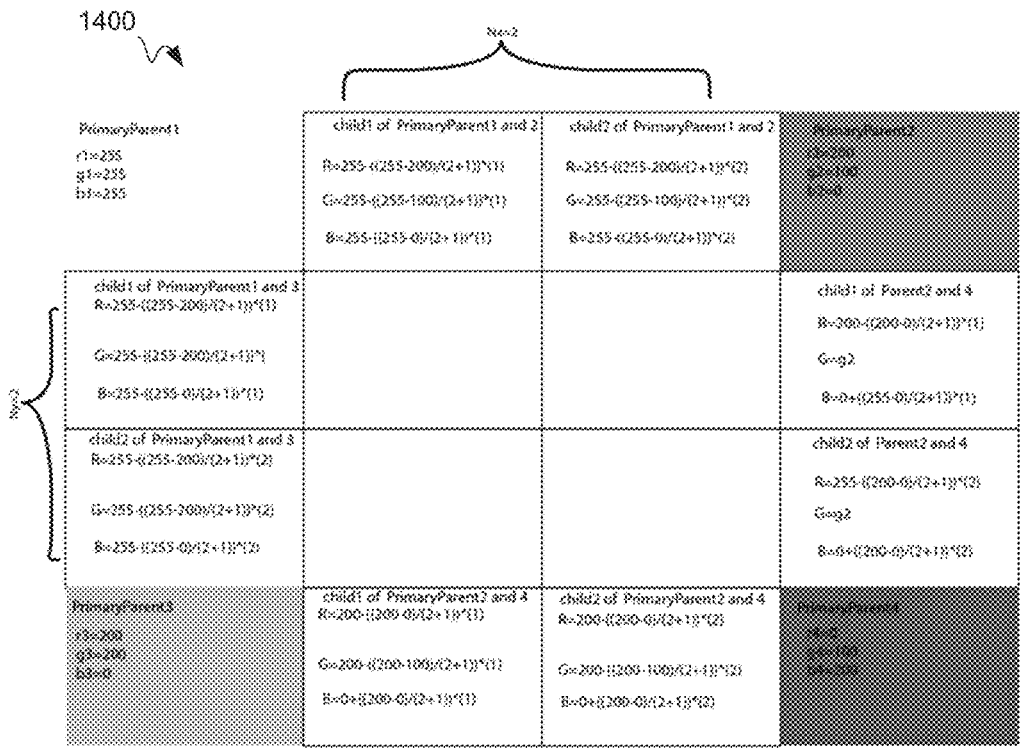
FIG. 14A illustrates a first subsequent matrix for calculating the colors of individual swatches for the exemplary color sorting puzzle game of FIG. 13 according to one embodiment of the present disclosure.

FIG. 14A illustrates a first subsequent matrix for calculating the colors of individual swatches for the exemplary color sorting puzzle game of FIG. 13. Matrix 1400, which can be a progression from matrix 1300, provides four established primary parent colors at the corners. Matrix 1400 also provides for 2 children cells or swatches in both of the vertical and horizontal directions, thus making 8 child cells that pend directly from the four primary parent cells or swatches. The math for calculating the colors of each of the child cells along each edge is also provided in matrix 1400.

Figure 14B:
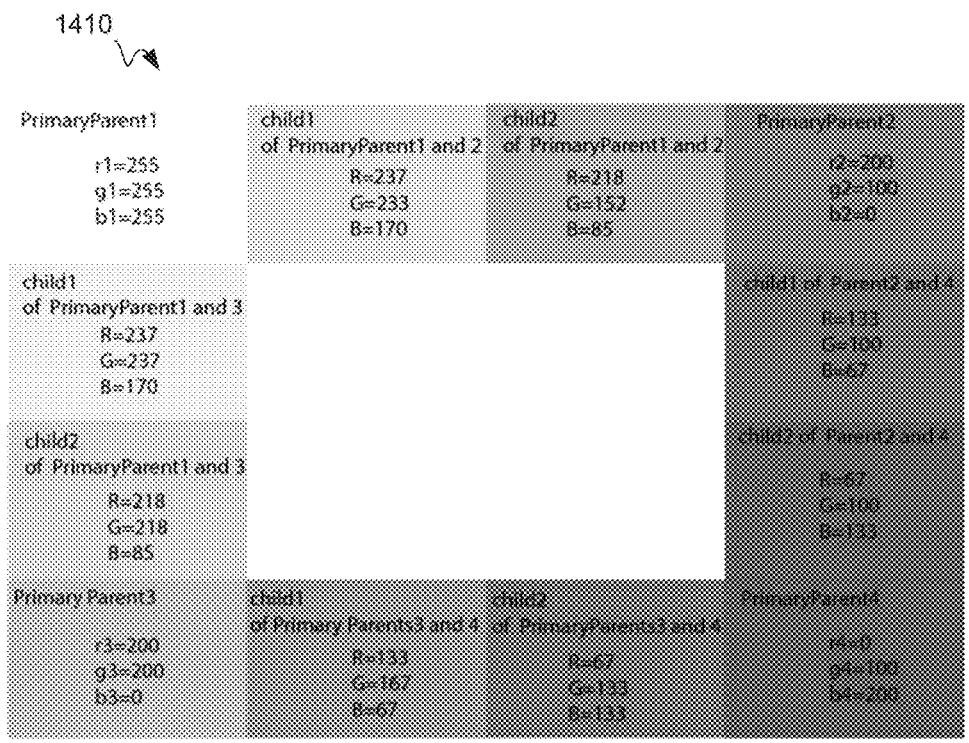
FIG. 14B illustrates a second subsequent matrix for calculating the colors of individual swatches for the exemplary color sorting puzzle game of FIG. 13 according to one embodiment of the present disclosure.
Figure 15:
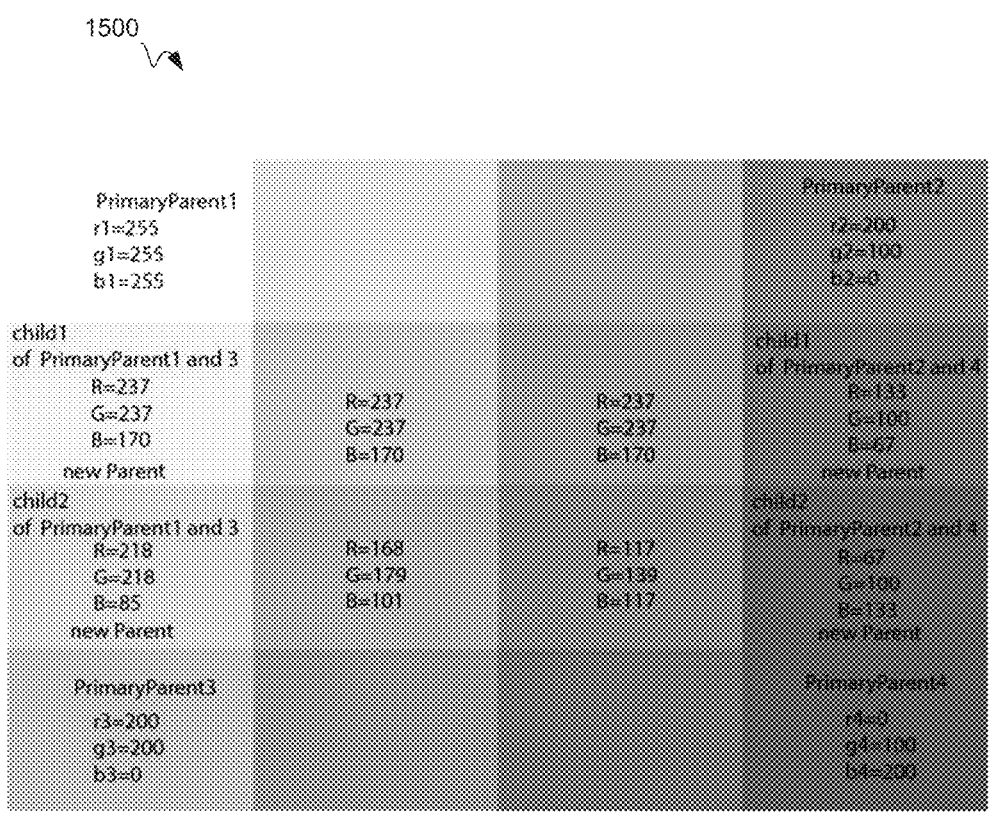
FIG. 15 illustrates a third subsequent matrix for calculating the colors of individual swatches for the exemplary color sorting puzzle game of FIG. 13 according to one embodiment of the present disclosure.

FIG. 14B illustrates a second subsequent matrix for calculating the colors of individual swatches. Matrix 1410 represents a further progression from matrix 1300 and matrix 1400. Here, the actual colors of each of the edge child swatches are provided. These edge child swatches can then be used to calculate the colors of the further child swatches or cells located in the middle of the matrix. Such a calculation and colors are shown in FIG. 15, which illustrates a third subsequent matrix for calculating the colors of individual swatches as matrix 1500. To complete the Huedoku Color Palette, as shown, the remaining internal color cells or swatches can be calculated either by rows or columns. In the exemplary matrix 1500, rows are used, such that children along the left and right sides become the parents for calculating the internal cells, as shown.

In addition to an RGB color model, and HSB model can be used in a similar manner to calculate varying generations of child color cells or swatches. As is generally known, HSB stands for Hue, Saturation, and Brightness, where these three values generate a unique color in which Hue specifies the location on the color spectrum. 0 and 359 are red, 180 is Green, and so forth. Saturation and Brightness range from 0-100, with 100 being full chroma (saturation) and 100 being full bright (value of color). A Bright value of 100 will create white.

It will be readily appreciated that every monitor or visual display is different, such that colors defined with the same values for RGB may appear different on a different monitor or screen. In some cases, to create an effective Huedoku Color Palette, the colors may be adjusted by hand so that the appearance is accurate. A given Huedoku Color Palette may appear harmonic when and it is in its proper order, primarily because it is completely generated from original Primary Parent Colors. The proper order for a solved pattern or puzzle is confirmed when every color swatch which has two adjacent opposing swatches (in any direction) is a blend of the color values of those two adjacent swatches.

Figure 16A:
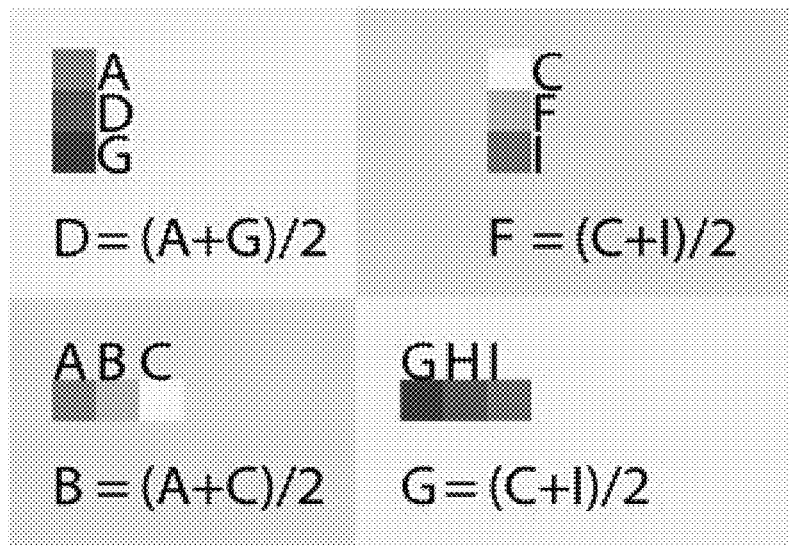
FIGS. 16A-16B illustrate various images showing exemplary calculations for determining child color swatches according to one embodiment of the present disclosure.
Figure 16B:
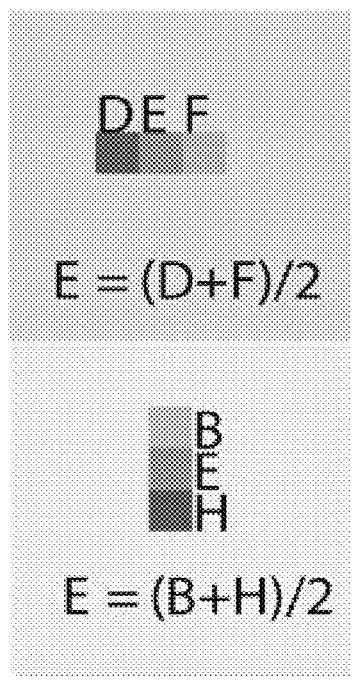

FIGS. 16A-16B illustrate various images showing exemplary calculations for determining child color swatches. These drawings illustrate the foregoing principle. As can be seen in each of these images, a swatch is a mix of whatever two colors that it is positioned between for purposes of a solved or original Huedoku Color Palette. Image series 1600 depicts various three swatch arrays for an exemplary 3×3 square matrix. For every such three swatch array, the middle child color swatch can be of a color that is halfway between its two respective parent color swatches on either side. For example, the first array represents the left side of a 3×3 matrix, where D=(A+G)/2. Similar equations are provided for other examples to calculate the middle child swatch color.

In this exemplary arrangement, it will be readily appreciated that A, C, G, and I are the primary parent colors. As such, B, D, F, and H represent the first set of child colors. The calculations for each of these child colors are shown. Image series 1610 of FIG. 16B depicts how E can be calculated in this 3×3 matrix. E can be found as halfway between any set of opposing parent swatches. As such, D and F can become secondary parent colors to determine further child color E, as shown. Alternatives for calculating the color of E may also be used, as will be readily appreciated. For example, B and H can also be used to calculate E.

As noted above, a child color is not always limited to the mathematical average of two directly adjacent parent colors. Rather, a weighted average or other nonlinear calculation may also be used, so long as the color of the child is somewhere between the colors of two opposing parents. In this manner, various child color determinations can be creatively altered by a puzzle creator or designer, such as to add other weighted effects or visual appearances.

Figure 17A:
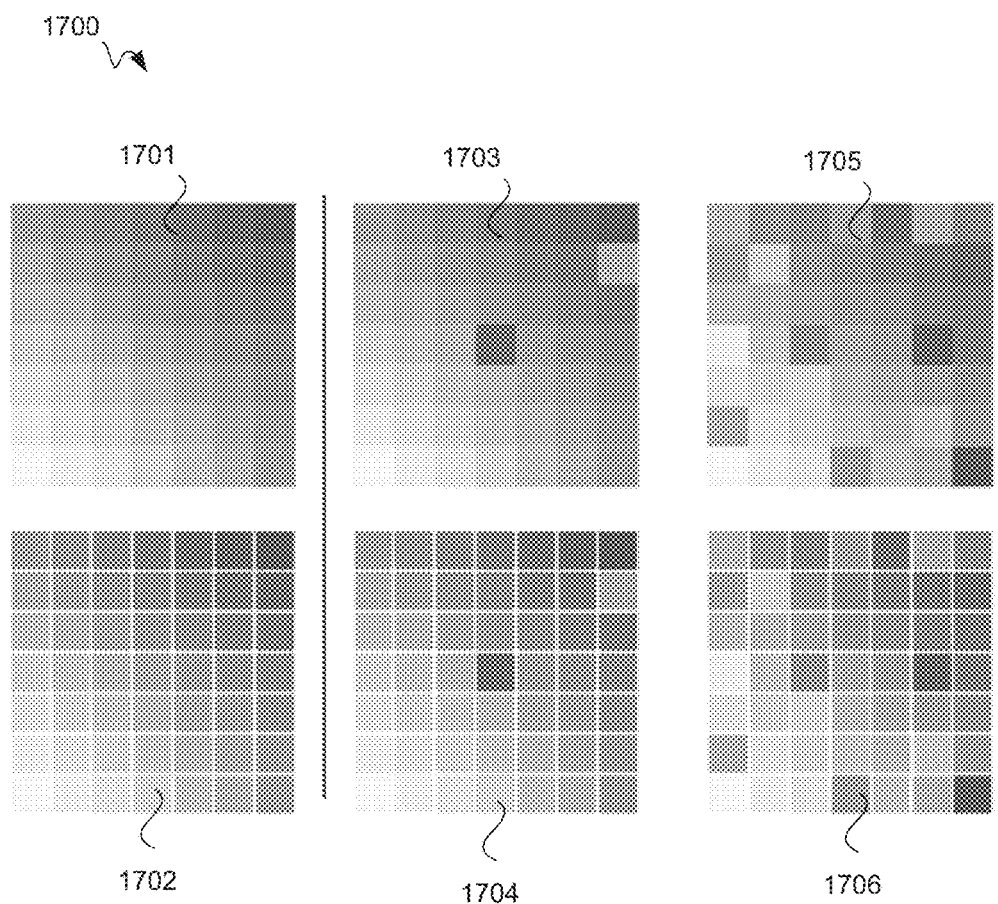
FIG. 17A illustrates various images of exemplary solved and unsolved color sorting puzzle games according to one embodiment of the present disclosure.

Turning next to FIG. 17A, various images of exemplary solved and unsolved color sorting puzzle games are shown.

Image series 1700 provides exemplary solved patterns 1701, 1702 and exemplary unsolved patterns or arrangements 1703-1706. In solved arrangement 1701, there are no or substantially no boundaries or separations between the various swatches, such that the visual effect of halation is maximized. In solved arrangement 1702, a small amount of separation or border exists between all of the various swatches or cells, such that a halation effect still exists but is not as pronounced as in solved pattern 1701.

Each of unsolved arrangements 1703-1706 depicts differing levels of scrambled or mixed up swatches. In arrangement 1703, which is mostly but not completely solved, a fair amount of halation can be observed across those portions of the puzzle that are solved. Conversely, arrangements 1705 and 1706 are significantly more scrambled and exhibit little to no halation across their swatches. In effect, color swatches that are placed way out of order challenge an overall visual aesthetic. In many cases then, it can be instinctive or intuitive for a user to move swatches into a better location within the puzzle by moving such swatches near others that are closer in color thereto. For example, many users will instinctively move the out of place swatch at the center of pattern 1703 more towards the upper right corner, so as to be closer to those that are closer in color. In many instance, an exact relocation can be arrived at due to such an intuitive nature. For example, the puzzle of arrangement 1703 can be solved by swapping the two clearly out of place swatches.

Figure 17B:
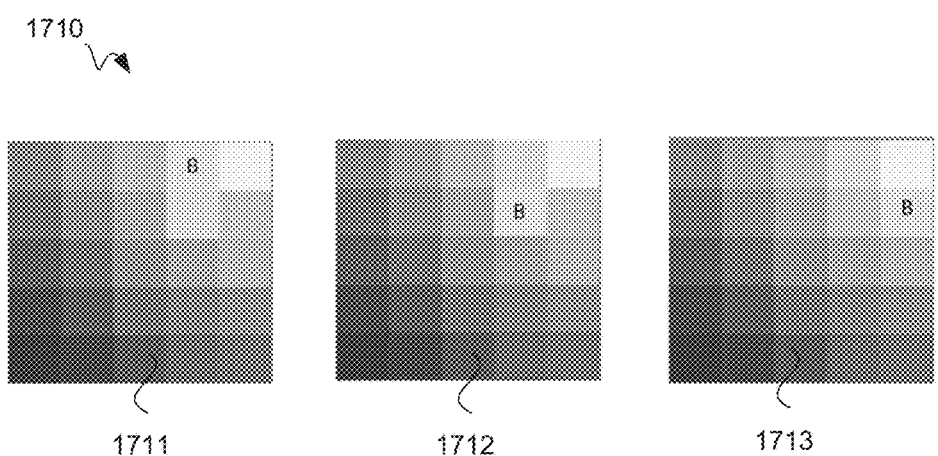
FIG. 17B illustrates various images of the same colored swatch located at different relative places within the same exemplary color sorting puzzle game according to one embodiment of the present disclosure.

FIG. 17B illustrates various images of the same colored swatch located at different relative places within the same exemplary color sorting puzzle game. Image series 1710 provides three separate arrangements or patterns 1711, 1712, 1713 where the same individual swatch "B" is located differently. When swatch B, which is the same color in every pattern, is located within the more greenish swatches in pattern 1711, this B swatch can appear to be pinker and/or darker than usual. When swatch B is relocated to a different position, such as in pattern 1712, then this swatch can appear to be less pink and/or lighter based upon its new direct neighbor swatches. The proper location of B is shown in pattern 1713. This provides another example of the visual phenomenon called simultaneous contrast. In effect, a given color swatch will appear differently depending upon its surrounding and touching colors. Similar effects are provided above in FIG. 8A, for example. Pronounced simultaneous contrast across many swatches can then result in halation, as detailed above.

Figure 18A:
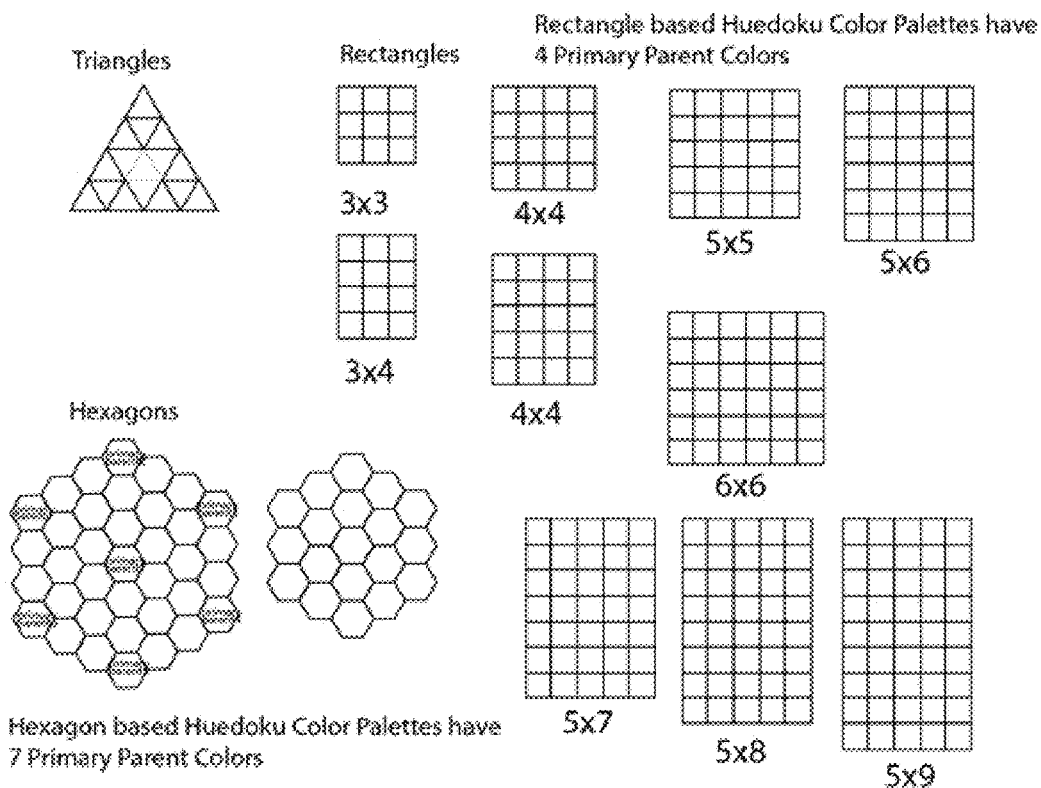
FIG. 18A illustrates various images of different sized and shaped exemplary color sorting puzzle games according to various embodiments of the present disclosure.
Figure 18B:
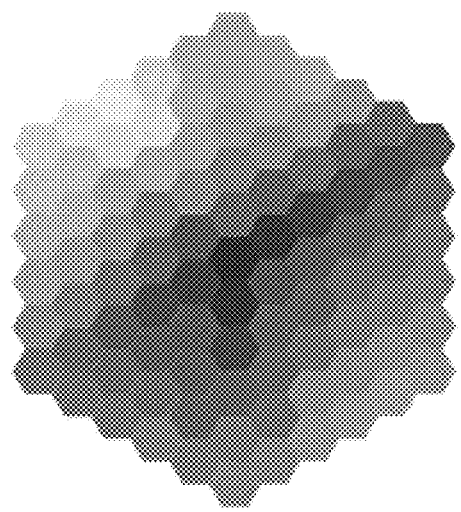
FIG. 18B illustrates an image of an exemplary hexagonal color sorting puzzle game according to one embodiment of the present disclosure.

Again, Huedoku or similar color sorting puzzle games are not limited in size or shape. FIG. 18A illustrates various images of different sized and shaped exemplary color sorting puzzle games according to various embodiments of the present disclosure. As shown, the shape and size of a given Huedoku Color Palette or other similar puzzle or game can include, but is not limited to, 3×3, 3×4, 4×4, 4×5, 4×6, 4×7, 5×5, 5×6, 5×7, 5×8, 5×9, 6×6, 7×7 and so forth for rectangular shaped palettes or puzzles. There is no limit to how large a given puzzle might be. The shape may also be a triangle or other polygon. In fact, FIG. 18B illustrates an image of an exemplary hexagonal color sorting puzzle game. Such an arrangement may have, for example, seven different primary parent colors, such as one at each corner and a seventh in the center. In various embodiments, three dimensional shapes may also be possible.

In various embodiments, color swatches that are next to each other can be touching. This can mean that the color swatches are immediately adjacent, with no border or separation in between. In an electronic embodiment, this can mean that pixels that make of the edge of one swatch are immediately next to edge pixels of a neighboring swatch. In some embodiments, such a "touching" may not be perfect, but rather than can be some small amount of border or separation between adjacent swatches. As noted above, various visual effects, such as halation, can be more pronounced or accentuated with full or substantial touching between properly located swatches. In short, color swatches may be touching, although this is not always required.

An originally formed or generated Huedoku Color Palette can represent a final solution or solved pattern for a color sorting puzzle game. As such, a Huedoku Color Palette can then be scrambled, such as by game software or another computing component, such that all of the color swatches are mixed at random. A user or player is then challenged to put the swatches back into a proper order, such that every swatch is in a proper color arrangement with all of its immediately neighboring swatches. In other words, such a solution puts the puzzle back into the original Huedoku Color Palette or a suitable rotation or mirror image thereof.

Figure 19A:
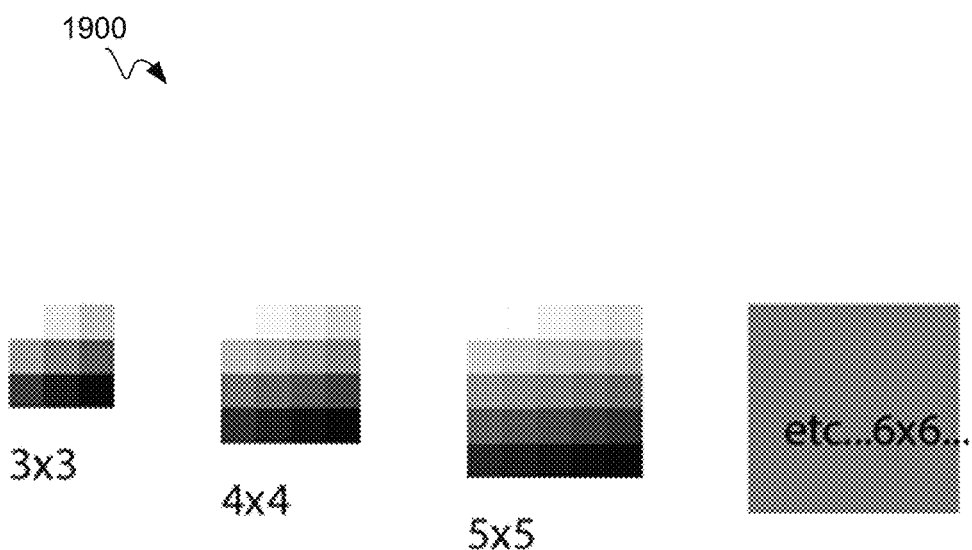
FIG. 19A illustrates various images of different sized exemplary square color sorting puzzle games according to various embodiments of the present disclosure.
Figure 19B:
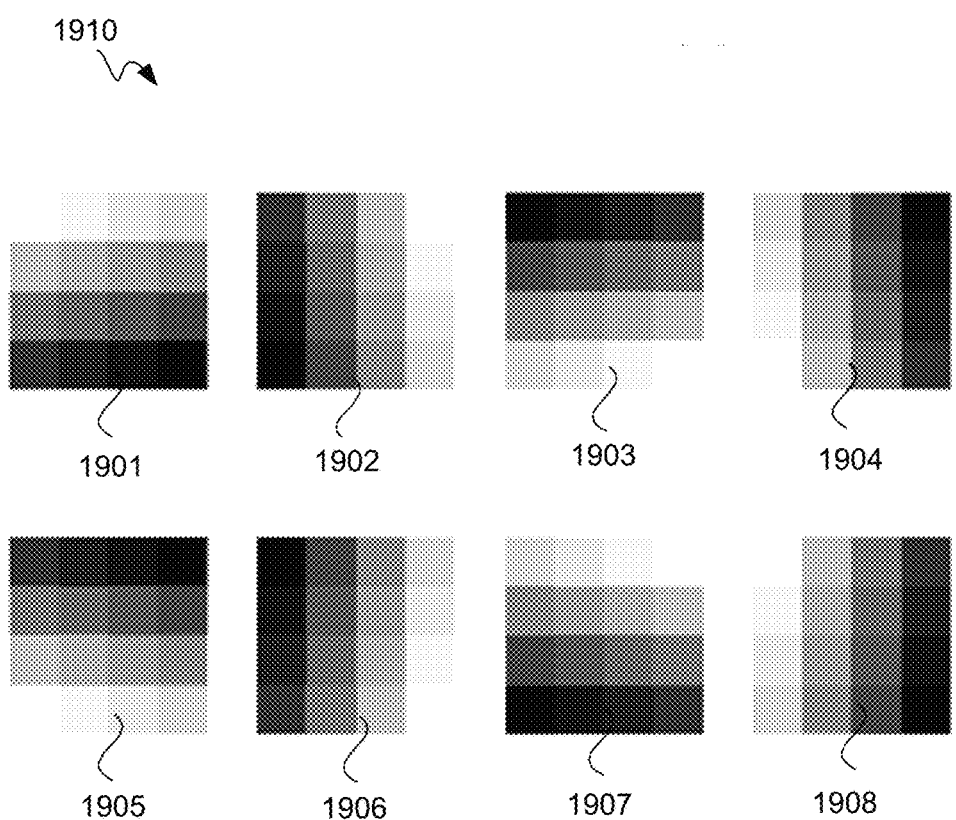
FIG. 19B illustrates various images of solved patterns for an exemplary 4×4 square color sorting puzzle game according to one embodiment of the present disclosure.

FIG. 19A illustrates various images of different sized exemplary square color sorting puzzle games. Image series 1900 depicts square Huedoku puzzles that are grey scale in color for 3×3, 4×4, 5×5, and 6×6 puzzle game arrangements. Again, it will be understood that other larger sizes are also possible. With respect to possible solved pattern arrangements, there can be multiple solutions in some embodiments. FIG. 19B illustrates various images of solved patterns for an exemplary 4×4 square color sorting puzzle game. Image series 1910 provides various solutions or solved patterns for a particular game or puzzle. Each of possible solutions 1901-1908 represents an original Huedoku Color Palette, albeit in different rotations or mirror images. Where solution 1901 might be the originally generated or created Huedoku Color Palette, each of solutions 1902-1904 represents another correct placement of all swatches, albeit at a different rotation of the original palette. Similarly, each of solutions 1905-1908 represent mirror images of the various solutions 1901-1904.

Not all embodiments need have multiple solutions, however. Where a square color sorting puzzle game might naturally have eight possible solutions, as noted above, further restrictions or rules on a given puzzle might reduce the number of possible answers, and in some cases constrain all possible solutions to one. For example, a given solution might require that the four corners (i.e., primary parent colors) be located in specific positions. In this event, there would be only one possible solution. For example, the puzzle game of FIG. 19B might require that the white swatch be in the upper left and the light grey primary parent color swatch be in the upper right. In such an instance, only solution 1901 will be proper. Various restrictions or indicators on game play can be used to let a player know that certain tiles or swatches must go in certain locations. For example, certain indicators on certain swatches can show that a particular swatch goes in a particular corner for a solved puzzle.

Figure 20A:
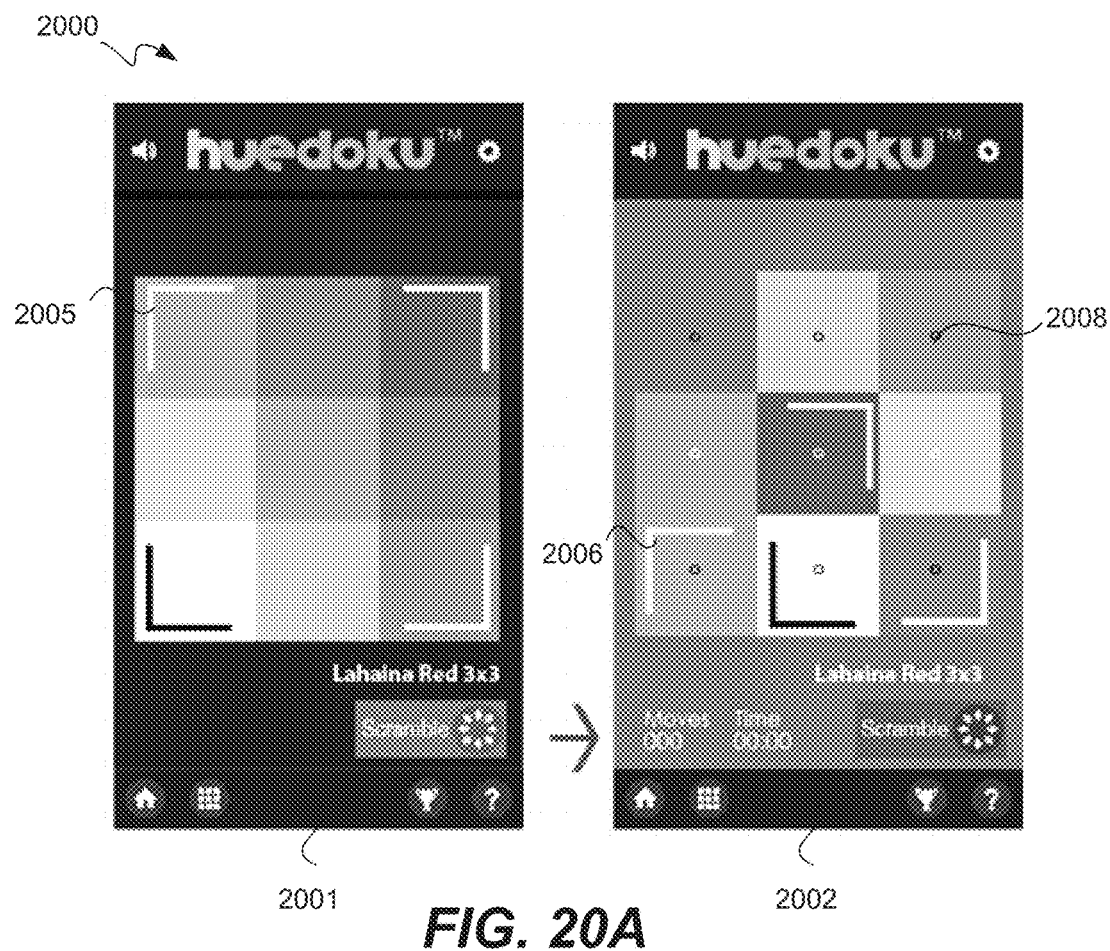
FIG. 20A illustrates various images of exemplary graphical user interfaces for providing color sorting puzzle games on a computing device according to one embodiment of the present disclosure.

Turning now to FIG. 20A, various images of exemplary graphical user interfaces for providing color sorting puzzle games on a computing device are shown. Graphical User Interface ("GUI") series 2000 depicts two images of a Hueduko game application, such as one that might be used on smart phones, tablets, or other similar devices. GUI 2001 shows a finished or solved 3×3 Huedoku game, while GUI 2002 shows the same finished 3×3 game with scrambled swatches. Various features can provide hints to players, as well as restrict the placement of certain swatches or game pieces. For example, carat 2005 in GUI 2001 can show that its respective tile or swatch belongs in the upper left of a finished puzzle or solved pattern. Such a tile or swatch is shown as being scrambled or out of place but still having carat 2006 in the scrambled puzzle of GUI 2002. As shown, other carats effective fix the locations of the other corner swatches, which can also provide the primary parent colors for the entire puzzle.

In addition to carats 2005 that may indicate or fix where particular corner swatches belong for a finished puzzle, one or more tiles may have a dot 2008 or other suitable indicator thereon. Such a dot 2008 can indicate that that particular swatch is now out of position relative to the overall puzzle game solution. As shown in GUI 2002 then, all nine swatches are out of position with respect to the final game solution (i.e., that which is shown in GUI 2001). Multiple corner carats 2005 also fix corner placements such that only one solution is possible, rather than 8.

Figure 20B:
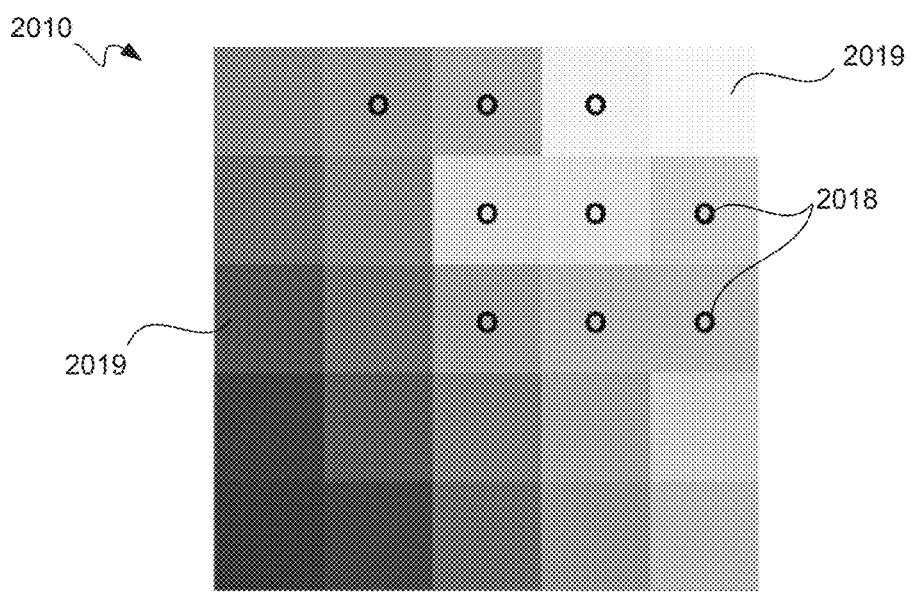
FIG. 20B illustrates an image of an exemplary unsolved arrangement having clues contained therein for a color sorting puzzle game according to one embodiment of the present disclosure.

FIG. 20B illustrates an image of an exemplary unsolved arrangement having clues contained therein for a color sorting puzzle game. Unsolved arrangement 2010 can include a number of colored swatches. Various swatches can have dots, circle, or other indicators 2018 to show that these swatches are out of place with respect to the final solution of a puzzle. Other tiles 2019 that do not have such indicators 2018 are then known to be in the correct location for a solved pattern or final solution. Overall, clues such as carats 2005 and/or dots or indicators 2008, 2018 can be provided to some players or users in order to aid in the solving of the puzzle or playing of the game. These and other such clues may or may not be provided in various embodiments. In some embodiments, the use of such clues may be part of a difficulty setting, such as that which can be selected by the user, for example.

In various embodiments, a player or user can be presented with an unsolved arrangement or pattern, such as a scrambled Huedoku puzzle, whereupon the user can move various swatches around to arrive at a solved pattern. This can involve the user touching or otherwise selecting or indicating a particular swatch, and then moving or relocating that swatch to another location. In some arrangements, a swatch at the new location can then trade places with the swatch that is being moved to the new location. In other arrangements, various swatches in between the original and new location may be shifted over to make room for the new swatch. In this latter manner, an old swatch that may be at or near a proper location is not suddenly moved far away from that location, such as what might occur when a swatch is moved much or all of the way across a puzzle.

Arriving at a solution or solved pattern may be accompanied by one or more suitable indicators in an electronic version of a game. For example, one or more sounds, flashing lights, animations, visual effects, or the like may let a user know that he or she has successfully solved a puzzle. Similarly, one or more indicators may let a user know that he or she has moved a given swatch to a correct location. For example, the removal of a center dot might be such an indicator. Alternatively, or in addition, a sound, flash, shimmer, or other visual indicator might also let a user know that a swatch or tile has been correctly placed to its overall proper location in the puzzle.

In various embodiments, a score or reward may be coupled to a particular game or solving of a game. For example, a user or player may earn points or score based on how fast he or she solves a puzzle, and/or how few moves he or she used to solve a puzzle. Less time and/or fewer moves can result in more points. Users can then compare scores with friends or across networks, and prizes or recognition may be awarded based upon high or the best scores.

In various embodiments, one or more alternative ways of using a Huedoku Color Palette might also be provided. In addition to a standard game or puzzle that involves moving swatches around to their correct locations relative to each other, a user might be presented with various Huedoku Color Palettes, and is then challenged to identify which ones are incorrect and which are correct. For example, some palettes might present fully solved patterns, while others might be slightly scrambled, such as where only two or three pieces or swatches are out of place. In other embodiments, a user might be allowed to create his or her own Huedoku Color Palette. Users might choose the Primary Parent Colors with a color picker, from a source image, and might also choose the RGB, HSL or other values from a color model. Users might be able to source a digital photo or other digital image to generate the colors to create a Huedoku Color Palette, for example. In other embodiments, users might be challenged to spot the one or more specific swatches or cells that are out of place in an otherwise correct pattern.

Figure 21:
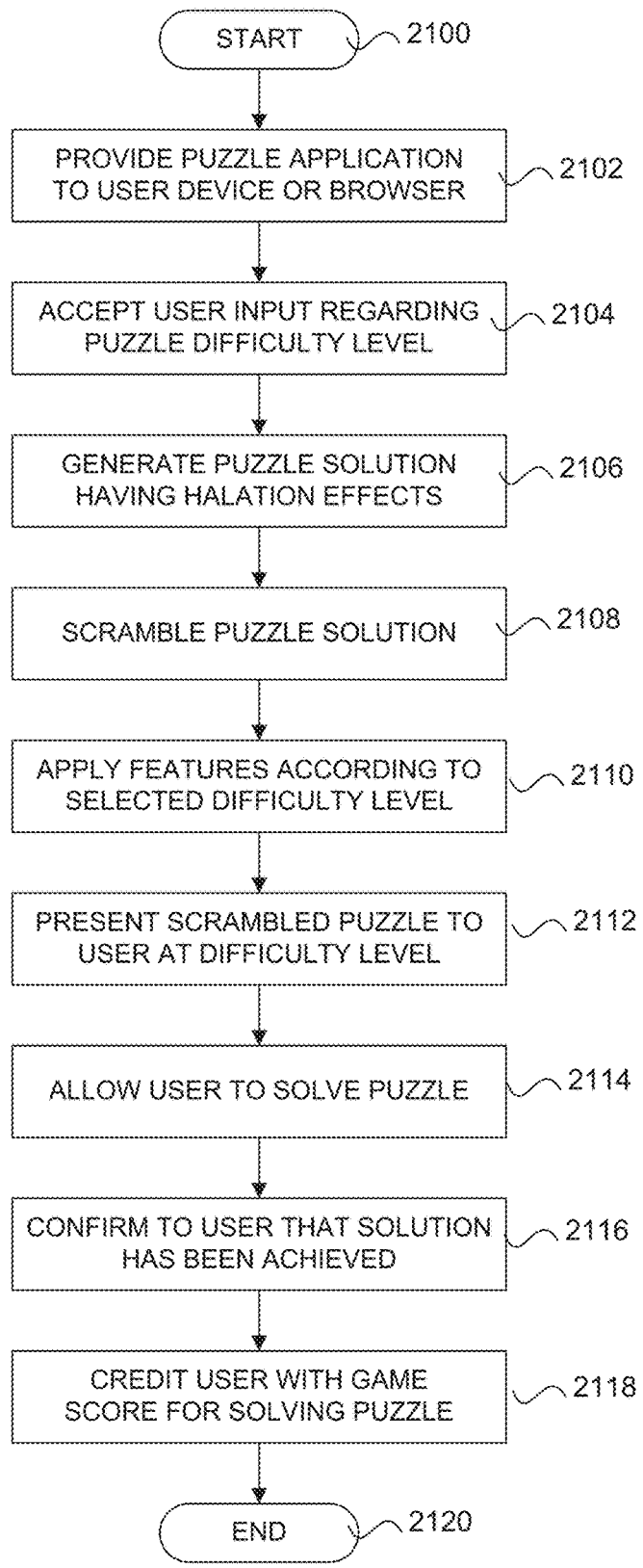
FIG. 21 provides a flowchart of an exemplary method of presenting a puzzle using a puzzle apparatus according to one embodiment of the present disclosure.

Turning lastly to FIG. 21, a flowchart of an exemplary method of presenting a puzzle using a puzzle apparatus according to one embodiment of the present disclosure is provided. After a start step 2100, a suitable puzzle application is provided to a user device or browser at a process step 2102. At a following process step 2104, a user input can be accepted with respect to a puzzle or game difficulty level. Such a difficulty can relate to the size or shape of the puzzle, for example. An easy level might be a 3×3 puzzle, while a difficult level might be a 7×7 puzzle. The existence of or prevalence of clues might also contribute to a difficulty level in some cases. For example, easy levels might provide corner carats and incorrect placement dots, while difficult levels might have none.

At a process step 2106, a puzzle solution can be generated. Such a puzzle solution can have visual effects such as halation, for example. The ability to invoke halation or other visual effects depends upon how colors are calculated for adjacent cells or swatches, as set forth in greater detail above. At process step 2108 the puzzle solution can be scrambled, after which features according to difficulty level can be applied, if applicable, at process step 2110. The scrambled puzzle can then be presented to the user at the appropriate difficulty level at process step 2112.

The user is then allowed to solve the puzzle at process step 2114, after which it is confirmed the user that a proper solution has been achieved at process step 2116. Again, such a confirmation can be by way of one or more sounds, lights, animations, or other visual effects. The user can then be credited with a game score for solving the puzzle at process step 2118. Again, such a score can be based upon speed as well as number of moves used to solve the puzzle. Puzzle difficulty may also be used to contribute to a game score calculation. The method then ends at end step 414.

For the foregoing flowchart, it will be readily appreciated that not every method step provided is always necessary, and that further steps not set forth herein may also be included. For example, added steps might include allowing a user login to a game network, providing feedback whenever a given swatch or game piece is correctly located, or allowing the user to select the primary parent colors. Further steps can involve comparing game scores to other users and awarding prizes to high scores, among other possible steps. Furthermore, the exact order of steps may be altered as desired, and some steps may be performed simultaneously. For example, step 2110 may be performed before or after step 2108 in various embodiments. In addition, while the foregoing examples are provided with respect to electronic or computerized puzzles or games, it will be readily appreciated that the provided methods can also be used with respect to physical pieces or games, as well as other alternative embodiments.

Those skilled in the art will readily appreciate that any of the systems and methods of the disclosure may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the disclosure may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the disclosure so long as players and operators thereof are provided with useful access thereto or the opportunity to play the game as described herein.

The various aspects, embodiments, implementations or features of the described embodiments can be used separately or in any combination. Various aspects of the described embodiments can be implemented by software, hardware or a combination of hardware and software. Computer readable medium can be any data storage device that can store data which can thereafter be read by a computer system. Examples of computer readable medium include read-only memory, random-access memory, flash drives, USB drives, CD-ROMs, DVDs, magnetic disk drives, magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A puzzle apparatus, comprising:
   a display region that presents a puzzle to a user, the puzzle having one or more unsolved arrangements and at least one solved pattern, wherein each of the one or more unsolved arrangements and at least one solved pattern are presented within said display region at different times, and
   a plurality of colored swatches arranged within said display region, wherein each of said plurality of colored swatches comprises a substantially solid color that is different from the substantially solid color of every other colored swatch, and wherein said plurality of colored swatches are adapted to be arranged into the at least one solved pattern that includes a correct placement of each of the colored swatches in relation to each other, which correct placement involves each respective colored swatch being adjacent within the at least one solved pattern only to the other colored swatches from the plurality of colored swatches that are closest in color to the respective colored swatch.

2. The puzzle apparatus of claim 1, wherein the at least one solved pattern includes a halation effect within its correctly placed colored swatches, and wherein the one or more unsolved arrangements do not include a halation effect within its colored swatches.

3. The puzzle apparatus of claim 1, wherein each of said plurality of colored swatches is bounded by substantially straight lines and is substantially the same shape as every other colored swatch.

4. The puzzle apparatus of claim 1, wherein the at least one solved pattern forms an overall shape, and wherein said overall shape is the same as an overall shaped formed by each of said one or more unsolved arrangements.

5. The puzzle apparatus of claim 1, wherein said plurality of colored swatches includes a plurality of primary parent color swatches and a plurality of child color swatches, and wherein the at least one solved pattern involves the plurality of primary parent color swatches being spaced apart from each other and the plurality of child color swatches being disposed between the plurality of primary parent color swatches.

6. The puzzle apparatus of claim 5, wherein the child color swatches between any two primary parent color swatches provide a color gradient between the colors of the primary parent color swatches.

7. The puzzle apparatus of claim 6, wherein each of the plurality of colored swatches forms a square shape, wherein the at least one solved pattern forms an overall square shape, wherein there are four primary parent color swatches, and wherein the four primary parent color swatches are located in the corners of the overall square shape of the at least one solved pattern.

8. The puzzle apparatus of claim 1, wherein said puzzle apparatus comprises a computing apparatus, and further comprising: a processor adapted to generate the puzzle, provide display output regarding the puzzle, and accept user input regarding the puzzle; a display component coupled to said processor and adapted to present the puzzle to the user on the display region contained thereon; and one or more input devices coupled to said processor and adapted to accept input from the user regarding the play of the puzzle.

9. The puzzle apparatus of claim 8, wherein said processor is further adapted to provide to the user an indication when the at least one solved pattern has been achieved.

10. The puzzle apparatus of claim 8, wherein said processor is further adapted to provide to the user a game score for arriving at the solved pattern.

11. The puzzle apparatus of claim 8, wherein said processor is further adapted to provide to the user with the ability to move a first of said plurality of colored swatches to the location of a second of said plurality of colored swatches.

12. The puzzle apparatus of claim 11, wherein said processor is further adapted to relocate automatically the second of said plurality of colored swatches to another location to make space for the first of said plurality of colored swatches.

13. A non-transitory computer readable medium including at least computer program code for presenting a puzzle using a computing puzzle apparatus, the non-transitory computer readable medium comprising:
   computer program code for presenting to a user via a computing puzzle apparatus a plurality of colored swatches arranged in a first order that forms an unsolved pattern, wherein each of said plurality of colored swatches comprises a substantially solid color that is different from the substantially solid color of every other colored swatch;

computer program code for allowing the user to rearrange the plurality of colored swatches from the first order to a second order that forms a solved pattern, wherein the solved pattern includes a correct placement of each of the colored swatches within the solved pattern, and wherein the correct placement of each of the colored swatches involves each respective colored swatch being adjacent within the pattern only to the other colored swatches from the plurality of colored swatches that are closest in color to the respective colored swatch; and computer program code for confirming to the user that the solved pattern has been achieved.

14. The non-transitory computer readable medium of claim 13, wherein the solved pattern includes a halation effect within its correctly placed second order of colored swatches, and wherein the unsolved pattern does not include a halation effect within its first order of colored swatches.

15. The non-transitory computer readable medium of claim 13, wherein each of said plurality of colored swatches is bounded by substantially straight lines and is substantially the same shape as every other colored swatch.

16. The non-transitory computer readable medium of claim 13, further comprising:

computer program code for accepting from the user an input regarding selection of a difficulty level with respect to the difficulty of arriving at the solved pattern; and computer program code for providing to the user an unsolved pattern of a complexity according to the selected difficulty level.

17. A method of presenting a puzzle using a puzzle apparatus, the method comprising:

presenting to a user via a puzzle apparatus a plurality of colored swatches arranged in a first order that forms an unsolved pattern, wherein each of said plurality of colored swatches comprises a substantially solid color that is different from the substantially solid color of every other colored swatch;

allowing the user to rearrange the plurality of colored swatches from the first order to a second order that forms a solved pattern, wherein the solved pattern includes a correct placement of each of the colored swatches within the solved pattern, and wherein the correct placement of each of the colored swatches involves each respective colored swatch being adjacent within the pattern only to the other colored swatches from the plurality of colored swatches that are closest in color to the respective colored swatch; and confirming to the user that the solved pattern has been achieved.

18. The method of claim 17, wherein the solved pattern includes a halation effect within its correctly placed second order of colored swatches, and wherein the unsolved pattern does not include a halation effect within its first order of colored swatches.

19. The method of claim 17, wherein each of said plurality of colored swatches is bounded by substantially straight lines and is substantially the same shape as every other colored swatch.

20. The method of claim 17, further including the steps of: accepting from the user an input regarding selection of a difficulty level with respect to the difficulty of arriving at the solved pattern; and providing to die user an unsolved pattern of a complexity according to the selected difficulty level.

\* \* \* \* \*